(12) United States Patent
Hughes et al.

(10) Patent No.: US 7,865,423 B2
(45) Date of Patent: Jan. 4, 2011

(54) SYSTEMS AND METHODS FOR PROVIDING INVESTMENT OPPORTUNITIES

(75) Inventors: John M. Hughes, Hebron, CT (US); Doug Rivard, Redding, CT (US)

(73) Assignee: Bridgetech Capital, Inc., Glastonbury, CT (US)

( * ) Notice: Subject to any disclaimer, the term of this patent is extended or adjusted under 35 U.S.C. 154(b) by 166 days.

(21) Appl. No.: 11/498,526

(22) Filed: Aug. 3, 2006

(65) Prior Publication Data

US 2007/0043650 A1 Feb. 22, 2007

Related U.S. Application Data

(60) Provisional application No. 60/786,406, filed on Mar. 27, 2006, provisional application No. 60/708,570, filed on Aug. 16, 2005.

(51) Int. Cl.
  *G06Q 40/00* (2006.01)
(52) U.S. Cl. .............................. 705/37; 705/7; 717/102; 715/205; 463/9
(58) Field of Classification Search .................. 705/37, 705/11; 463/9; 715/205
  See application file for complete search history.

(56) References Cited

U.S. PATENT DOCUMENTS

| | | | | |
|---|---|---|---|---|
| 4,525,599 | A | * | 6/1985 | Curran et al. ................ 713/190 |
| 4,933,842 | A | | 6/1990 | Durbin et al. |
| 5,030,945 | A | | 7/1991 | Yeomans et al. |
| 5,193,056 | A | | 3/1993 | Boes |
| 5,262,942 | A | | 11/1993 | Earle |
| 5,649,116 | A | | 7/1997 | McCoy et al. |
| 5,761,442 | A | | 6/1998 | Barr et al. |
| 5,779,549 | A | * | 7/1998 | Walker et al. ................ 463/42 |
| 5,784,696 | A | | 7/1998 | Melnikoff |
| 5,794,207 | A | * | 8/1998 | Walker et al. ................ 705/77 |
| 5,799,287 | A | * | 8/1998 | Dembo ...................... 705/36 R |
| 5,806,047 | A | | 9/1998 | Hackel et al. |
| 5,806,048 | A | | 9/1998 | Kiron et al. |
| 5,827,070 | A | * | 10/1998 | Kershaw et al. ............. 434/322 |
| 5,916,024 | A | * | 6/1999 | Von Kohorn .................. 463/40 |
| 5,933,811 | A | * | 8/1999 | Angles et al. ............ 705/14.56 |
| 5,947,747 | A | * | 9/1999 | Walker et al. ............... 434/354 |
| 5,948,054 | A | | 9/1999 | Nielsen |
| 5,978,778 | A | | 11/1999 | O'Shaughnessy |

(Continued)

OTHER PUBLICATIONS

Sugato Chakravarty and Asani Sarkar, Can competition between brokers mitigate agency conflicts with their customers, 1997—http://ideas.repec.org/p/fip/fednrp/9705.html (Sarkar).*

(Continued)

*Primary Examiner*—Ella Colbert
*Assistant Examiner*—Chika Ojiaku
(74) *Attorney, Agent, or Firm*—Goodwin Procter LLP

(57) ABSTRACT

The invention relates to methods and systems for providing investment competitions. In one aspect, trading algorithms that automatically generate trading instructions in response to market data are developed by and received from a distributed plurality of independent trading algorithm developers. The algorithms are periodically executed against market data and generate trading instructions, which, based on an association of investment accounts with the trading algorithms, initiate correlative trades in the investments accounts.

18 Claims, 8 Drawing Sheets

U.S. PATENT DOCUMENTS

| | | | | |
|---|---|---|---|---|
| 6,010,403 A * | 1/2000 | Adam et al. | | 463/6 |
| 6,112,049 A * | 8/2000 | Sonnenfeld | | 434/350 |
| 6,161,098 A | 12/2000 | Wallman | | |
| 6,236,980 B1 | 5/2001 | Reese | | |
| 6,260,019 B1 | 7/2001 | Courts | | |
| 6,264,560 B1 * | 7/2001 | Goldberg et al. | | 463/42 |
| 6,275,814 B1 | 8/2001 | Giansante et al. | | |
| 6,338,047 B1 | 1/2002 | Wallman | | |
| 6,370,516 B1 | 4/2002 | Reese | | |
| 6,393,409 B2 | 5/2002 | Young et al. | | |
| 6,405,179 B1 | 6/2002 | Rebane | | |
| 6,453,303 B1 | 9/2002 | Li | | |
| 6,473,084 B1 | 10/2002 | Phillips et al. | | |
| 6,484,152 B1 | 11/2002 | Robinson | | |
| 6,510,419 B1 | 1/2003 | Gatto | | |
| 6,564,191 B1 | 5/2003 | Reddy | | |
| 6,594,643 B1 * | 7/2003 | Freeny, Jr. | | 705/36 R |
| 6,601,044 B1 | 7/2003 | Wallman | | |
| 6,606,615 B1 | 8/2003 | Jennings et al. | | |
| 6,681,211 B1 | 1/2004 | Gatto | | |
| 6,709,330 B1 | 3/2004 | Klein et al. | | |
| 6,792,399 B1 | 9/2004 | Phillips et al. | | |
| 6,801,199 B1 * | 10/2004 | Wallman | | 345/440 |
| 6,824,462 B2 * | 11/2004 | Lydon et al. | | 463/9 |
| 6,983,257 B2 | 1/2006 | Gatto | | |
| 6,996,539 B1 | 2/2006 | Wallman | | |
| 7,016,872 B1 | 3/2006 | Bettis et al. | | |
| 7,047,218 B1 | 5/2006 | Wallman | | |
| 7,110,971 B2 * | 9/2006 | Wallman | | 705/36 R |
| 7,117,176 B2 | 10/2006 | Wallman | | |
| 7,149,716 B2 | 12/2006 | Gatto | | |
| 7,155,510 B1 | 12/2006 | Kaplan | | |
| 7,167,838 B1 | 1/2007 | Gatto | | |
| 7,509,274 B2 * | 3/2009 | Kam et al. | | 705/35 |
| 2001/0027430 A1 * | 10/2001 | Sabourian | | 705/35 |
| 2001/0034641 A1 | 10/2001 | D'Amico et al. | | |
| 2001/0042037 A1 * | 11/2001 | Kam et al. | | 705/36 |
| 2002/0002520 A1 | 1/2002 | Gatto | | |
| 2002/0004776 A1 * | 1/2002 | Gladstone | | 705/37 |
| 2002/0013749 A1 * | 1/2002 | Ricciardi | | 705/35 |
| 2002/0022988 A1 * | 2/2002 | Columbus et al. | | 705/11 |
| 2002/0042764 A1 * | 4/2002 | Gardner et al. | | 705/35 |
| 2002/0059126 A1 * | 5/2002 | Ricciardi | | 705/36 |
| 2002/0091608 A1 * | 7/2002 | Odegaard et al. | | 705/36 |
| 2002/0107770 A1 * | 8/2002 | Meyer et al. | | 705/36 |
| 2002/0133447 A1 * | 9/2002 | Mastman | | 705/36 |
| 2002/0161696 A1 * | 10/2002 | Gebert | | 705/36 |
| 2002/0164070 A1 * | 11/2002 | Kuhner et al. | | 382/159 |
| 2002/0174058 A1 * | 11/2002 | Baghdady | | 705/37 |
| 2002/0184131 A1 * | 12/2002 | Gatto | | 705/36 |
| 2003/0018570 A1 * | 1/2003 | McCabe et al. | | 705/37 |
| 2003/0046209 A1 * | 3/2003 | Brandenberger et al. | | 705/36 |
| 2003/0065601 A1 * | 4/2003 | Gatto | | 705/36 |
| 2003/0074293 A1 * | 4/2003 | Kiron et al. | | 705/36 |
| 2003/0084014 A1 * | 5/2003 | Sohrabi et al. | | 706/20 |
| 2003/0093348 A1 * | 5/2003 | Finn | | 705/35 |
| 2003/0093353 A1 * | 5/2003 | Ward et al. | | 705/36 |
| 2003/0126054 A1 | 7/2003 | Purcell | | |
| 2003/0130021 A1 * | 7/2003 | Lydon et al. | | 463/9 |
| 2003/0154151 A1 | 8/2003 | Biondi et al. | | |
| 2003/0187766 A1 * | 10/2003 | Akashi | | 705/35 |
| 2003/0187771 A1 | 10/2003 | Bulan | | |
| 2004/0002913 A1 | 1/2004 | Breen et al. | | |
| 2004/0024677 A1 | 2/2004 | Wallman | | |
| 2004/0024678 A1 | 2/2004 | Wallman | | |
| 2004/0034679 A1 | 2/2004 | Krevet | | |
| 2004/0039675 A1 | 2/2004 | Wallman | | |
| 2004/0078464 A1 | 4/2004 | Rajan et al. | | |
| 2004/0111353 A1 | 6/2004 | Ellis et al. | | |
| 2004/0133497 A1 | 7/2004 | Spear | | |
| 2004/0143533 A1 | 7/2004 | Preist et al. | | |
| 2004/0177319 A1 | 9/2004 | Horn | | |
| 2004/0205529 A1 | 10/2004 | Poulose et al. | | |
| 2005/0015323 A1 | 1/2005 | Myr | | |
| 2005/0080695 A1 | 4/2005 | Gatto | | |
| 2005/0149424 A1 | 7/2005 | Weinberger | | |
| 2005/0149427 A1 | 7/2005 | Meehan et al. | | |
| 2005/0192890 A1 | 9/2005 | Wallman | | |
| 2005/0240456 A1 | 10/2005 | Ward et al. | | |
| 2005/0288996 A1 | 12/2005 | Wallman | | |
| 2006/0074785 A1 | 4/2006 | Festog et al. | | |
| 2006/0080212 A1 | 4/2006 | Anderson et al. | | |
| 2006/0173761 A1 | 8/2006 | Costakis | | |
| 2006/0173764 A1 | 8/2006 | Costakis et al. | | |
| 2006/0218179 A1 | 9/2006 | Gardner et al. | | |
| 2007/0038544 A1 | 2/2007 | Snow et al. | | |
| 2007/0055599 A1 * | 3/2007 | Arnott | | 705/35 |
| 2007/0061235 A1 * | 3/2007 | Timmons et al. | | 705/36 R |
| 2007/0083456 A1 * | 4/2007 | Akers | | 705/37 |
| 2007/0208643 A1 * | 9/2007 | Gauthereon et al. | | 705/36 R |
| 2007/0208657 A1 * | 9/2007 | Petrino | | 705/37 |
| 2007/0250378 A1 * | 10/2007 | Hughes et al. | | 705/11 |
| 2008/0005013 A1 * | 1/2008 | Wallman | | 705/37 |
| 2008/0109384 A1 * | 5/2008 | Preston | | 705/36 R |

OTHER PUBLICATIONS

Sugato Chakravarty, A Model of Broker's Trading, With Applications to Order Flow Internalization, Purdue University, 2001 (Model).*
Matt Rand, Amateur Gurus: Class of 2004, www.forbes.com, Mar. 22, 2004, (Forbes).*
International Search Report for PCT/US06/31279, dated Aug. 17, 2007, 3 pages.
Written Opinion for PCT/US06/31279, dated Aug. 17, 2007, 6 pages.
U.S. Appl. No. 12/017,158, Hughes.
U.S. Appl. No. 09/610,160, Horn.
U.S. Appl. No. 09/610,163, Horn.
U.S. Appl. No. 09/610,164, Horn.
U.S. Appl. No. 09/722,050, Gatto.
U.S. Appl. No. 09/570,814, Snow et al.
U.S. Appl. No. 09/516,787, Wallman.
Web pages from www.marketocricy.com: http://www.marketocricy.com/cgi-bin/WebObjects/Portfolio.woa/ps/AboutOverviewPage/bfix=1 ,retrieved from the Internet on Apr. 7, 2005.
Performance Tracker, Marketocracy Masters 100 Fund (MOFQX) and Prospectus, Mar. 21, 2005, retrieved from the Internet on Apr. 7, 2005—www.marketocracy.com.
Web pages from www.stockjungle.com/community/main.asp , as of May 11, 2000 as downloaded from www.archive.org on Apr. 7, 2005.

* cited by examiner

| 805 | 810 | 815 | 820 | 825 | 830 | 835 | 840 | 845 |
|---|---|---|---|---|---|---|---|---|
| ALGORITHM | TRADER / ALLOCATION % | PORTFOLIO | FEE STRUCTURE | PORTFOLIO ALLOCATION | BASIS POINTS | PORTFOLIO MANAGEMENT FEE | PERF ATTRIBUTION | LICENSE FEE |
| A1 | T1 – 60% T2 – 40% | P1 | PERIODIC FIXED | N/A | N/A | N/A | N/A | $500 |
| | | P2 | PERFORMANCE BASED | 25% | 2.5 | $10,000 | N/A | $250 |
| | | P3 | ATTRIBUTION PERFORMANCE BASED | 33% | 3.3 | $10,000 | 75% | $750 |
| TOTAL | | | | | | | | $1,500 |
| | TRADER 1 SHARE | | | | | | | $900 |
| | TRADER 2 SHARE | | | | | | | $600 |

SYSTEMS AND METHODS FOR PROVIDING INVESTMENT OPPORTUNITIES

CROSS-REFERENCE TO RELATED APPLICATIONS

This application claims priority to U.S. provisional patent application Ser. Nos. 60/708,570, filed Aug. 16, 2005, and 60/786,406, filed Mar. 27, 2006, the entire disclosures of which are incorporated herein by reference.

TECHNICAL FIELD

This invention relates to computer-based methods and systems for investing and, more particularly, to methods and systems for providing investment opportunities to individual and other non-institutional investors.

BACKGROUND

Investors have long struggled with the problem of how they should invest their savings. The public securities markets allow investors to buy and sell securities, but in the past the general public generally has been at a disadvantage to professional brokers and securities traders, in that individuals and other non-institutional investors did not have the information and other resources needed to be competitive in the market. More recently, with the improvement in computers and networks, it has been possible for retail investors to obtain information and access to the markets that they previously did not. Still, managing investments has become ever more complicated, with many different sorts of securities available for investment.

One investment vehicle available to retail investors is the publicly registered mutual fund. Mutual funds allow investors to collect their investment money in one fund that is under the direction of a professional manager. The professional manager hopefully can spend the time, and has the ability, to effectively manage the fund that is entrusted to her. One disadvantage of mutual funds is that they can become large and unwieldy. Fund managers are paid as a percentage of funds under management, and so there is an incentive for the managers to grow the funds as large as possible. This may not be to the investor's benefit, because an investment strategy that was profitable for a fund of $200 million, for example, may not be nearly as profitable when the fund has $2 billion under management, because a change in position will be noticed by the market. Mutual funds can be expensive investments because of the high management fees.

Unregistered investment vehicles (often referred to as "hedge funds") are another offering that allow certain investors to put their investment money into one fund. Hedge funds have the promise of allowing an investor to have his investments professionally managed without some of the disadvantages of mutual funds. For one thing, because they are unregistered and often smaller, the market is less likely to notice a change in an investment position. Hedge funds also can engage in riskier strategies that have the prospect of yielding higher returns. Yet, hedge funds are also expensive investments because of the management fees, and not all investors can participate, due to limitations in financial status. It is also very difficult to compare the performance and strategy of various hedge funds.

While many still believe that a talented individual, either alone or with analytical aids such as computers, can do better than the market on average, a need still exists for an investment vehicle that allows an investor to make informed investment choices while having access to talented investment advisors.

SUMMARY OF THE INVENTION

Many individuals with backgrounds in computer science, math, and similar fields that are traditionally outside of the realm of the financial services industry often experiment with quantitative investment strategies using various algorithms, optimization techniques, and statistical theories. Some of these individual investors may even outperform the so-called "professional money managers" due at least in part to better investment decisions and reduced expenses. The intellectual challenge and personal satisfaction from "beating the street" provide further impetus and to continue to hone these investment strategies.

Further, there is believed to be an untapped community of individuals who possess the technical ability to build and operate quantitative models that attempt to predict market behavior. Thus, there is also a need for methods and systems that provide individual investors with access to these models along with proper oversight and security.

In general, the invention relates to providing infrastructure, process controls, and manpower to generate, measure, distribute, and execute investment strategies with the goal of making high-quality, market-tested investment models available to investors, perhaps complementing or supplanting traditional stock brokers and internet-based investment sites. Generally speaking, this goal can be achieved, in one exemplary implementation, through a two-step process. First, exceptional traders and/or trading algorithms ("algorithms") are identified through one or more virtual trading qualification phases, such as, in some examples, contests. By providing multiple qualification phases that take place over a variety of time periods and cover numerous investment options, those individuals that consistently outperform their peers over time are identified, and invited to participate as portfolio managers, managing real money and receiving, in some instances, rewards such as prizes, money, and/or increased performance ratings. Second, individual investors without the time or inclination to develop such predictive models are invited to select one or more portfolio managers and allocate percentages of their account to the portfolio managers' strategies, effectively allowing the system to manage the purchase and sale of securities in the investors' own account(s), but all the while within limits and guidelines defined by the investor.

In a first aspect, the invention relates to a method for initiating trades in an investment account that includes administering trading qualification events among a group of traders, and based, for example, on the results of the events, selecting some of the traders as portfolio managers and allocating money to the portfolio managers, based, for example, on the portfolio managers' individual trading strategies. The method also includes distributing information regarding the portfolio managers and their investment strategies to investors (e.g., individual investors and/or groups of investors) and facilitating the investors' selection of portfolio managers. Trade instructions are received from the portfolio managers, and correlative trade instructions are initiated in investment accounts associated with the investors.

In some embodiments, the trading qualification events are virtual—i.e., the events use historical and/or fictional market data. Investors can select one or more than one portfolio manager, and a portfolio manager may be selected by one or more investors. In some cases, the correlative trade is adjusted (e.g., in absolute dollar amount, number or proportion or shares, duration of option contracts) prior to execution in the investor's accounts. The adjustment can be based, for example, on trading rules provided by the investor. The resulting adjustment may, in some cases, result in the trade not being executed, or a portion of the trade not being executed.

In cases where the adjustment is proportional, the adjustment can be based on a relationship between an existing portfolio allocation and a resulting portfolio allocation if the correlative trade were to be executed and/or a relationship between a total portfolio value attributed to the portfolio manager and a total portfolio value attributed to the investor, which may be based on account balances from multiple accounts. In some instances, the trade instructions may execute in multiple investor accounts. The method may also include the step of executing the trading instructions in the investor accounts.

In another aspect, the invention provides a system for performing the methods described above. As an example, the system includes a communications server for communicating investment information to investors, a qualification server for administering qualification events among the traders to identify exemplary traders, a performance module for calculating performance data associated with the traders, an allocation module for facilitating selection of traders by investors and allocating investors accounts among the selected traders, and a trading module for receiving a trade instruction from one of the traders and, in response, initiating a correlative trade in the investor accounts. In some embodiments, the system also includes a performance display module for displaying performance data associated with the traders.

Another aspect of the invention provides a method for administering an investment competition. The method includes providing an algorithm development environment (e.g., a client-based application and/or interactive browser-based application) to traders that includes a language for implementing algorithms for initiating trading instructions in response to market data, providing access to a database of historical market performance data with which the traders can test the algorithms, receiving algorithms from the traders, determining a performance metric (based, in some cases, on periodic execution of the algorithms as determined by the trader for example) for the received algorithms and using the performance metric to select one (or in some cases more than one) of the algorithms as a winning algorithm, which, in some instances, may be used to programmatically determine trading instructions (in the form or correlative trades, for example) for a pool of assets.

In some embodiments, a rating can be attributed to an algorithm based, for example, on the performance metric, and in some cases a rating can then be attributed to the trader who submitted the algorithm. The performance metric can be determined over a period of time (e.g., an hour, a day, a week, a month, a year, or any measurable time period). The trader's rating can also be based on a previous rating attributed to the trader. Likewise, the algorithm's rating can also be based on a previous rating attributed to the algorithm. The rating can be used to select a trader, a group of traders, an algorithm, or a group of algorithms to associate a pool of assets for investment on behalf of investors. Selected traders and/or traders that submitted winning algorithms can be compensated for the algorithms. In some embodiments, the method also includes storing selected algorithms in a library of algorithms, and access to the library may be provided for a fee (such as a subscription or license fee). Access, in some cases, may be limited to trading instructions generated by the algorithms in response to market data.

In another aspect, the invention provides a system for facilitating investment algorithm competitions. Such a system includes a web server for communicating an algorithm development application including a language for implementing trading instructions in response to market data to client machines that are operated by traders, a client interface server communicating with the algorithm development application and receiving algorithms from the traders, a parser for interpreting the received algorithms, and a performance module for executing the algorithm, testing the algorithm, and calculating a performance metric for the algorithm.

In certain embodiments of this aspect of the invention, the system can also include one or more of the following components: a database server for providing historical market data to the performance module and for calculation of the performance metric, a trading module for receiving the trade instructions and initiating trades in response to the instructions, and an allocation module for facilitating the selection of algorithms by individual investors and allocating individual investors accounts among algorithms selected by the individual investors. In some embodiments, the trading module can execute trades in the individual investor accounts based on the received trade instructions. The performance module, in some cases, can also identify algorithms as winning algorithms, and the system may also include a compensation module for determining compensation for traders who submitted winning algorithms. In certain embodiments, the system may also include a library for storing winning algorithms, and may optionally include an access module for governing access to the library.

In another aspect, the invention provides a method for managing a pool of investable assets that includes providing a description of investment-strategies to a distributed community of traders, and receiving, from the traders, trading algorithms that implement the strategies. The method further includes selecting a subset of the trading algorithms and using the selected algorithms to initiate trading instructions for execution on the pool of investable assets.

In some embodiments, the method also includes identifying and compensating (e.g., in the form of a one-time or periodic payment of cash and/or prizes) the traders that submitted the selected algorithms. In some cases, a performance metric is calculated for the pool of assets, and the compensation is based on such metric.

In another aspect, the invention provides a system for implementing such methods, including a communication server for providing a description of investment strategies to a distributed community of traders, and, in response, receiving trading algorithms intended to implement the strategies from the traders. The system also includes a performance module for testing the received algorithms and selecting certain algorithms for use in managing a pool of investable assets and a trading module for initiating trading instructions for execution on the pool of investable assets based on the selected algorithms.

In some embodiments, such a system can also include a database server for providing historical market data to the performance module and a compensation module for determining compensation for traders who submitted the selected algorithms.

In another aspect, a method for programmatically generating trade instructions based on a set of trading algorithms includes receiving a first trading algorithm from a first developer and a second trading algorithm from a second developer, each algorithm configured to generate trading instructions in response to market data, and receiving a third trading algorithm (from the first developer, the second developer, or in some cases a third developer) configured to execute trades based on output from the first and second trading algorithms.

In some embodiments, the third trading algorithm aggregates trading instructions from the first trading algorithm and the second trading algorithm, and in some cases may selectively execute trades based on the trading instructions of the first and second algorithms. Such selective execution can be based on predetermined rules governing the execution of trade instructions from the first and second algorithms, market data, and/or a combination of the two and/or other data.

In another aspect, the invention provides a method for providing a trading algorithm competition including facilitating the development of trading algorithms for generating trading instructions in response to market data by algorithm developers, running a subset of the developed algorithms for a predetermined time period using market data as input to the algorithms, evaluating the performance of the algorithms for a predetermined period of time and publishing the results of the evaluation.

In some embodiments, the algorithms may be rated based on the evaluated performance, and the ratings can be published. The algorithms may be allocated to an investment account. In some cases, execution of the algorithms generates trading instructions, which may in turn cause the execution of trades in the accounts.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention.

FIG. 8 is a table indicating a license fee allocation technique for compensating traders in accordance with one embodiment of the invention.

DETAILED DESCRIPTION

Figure 1:
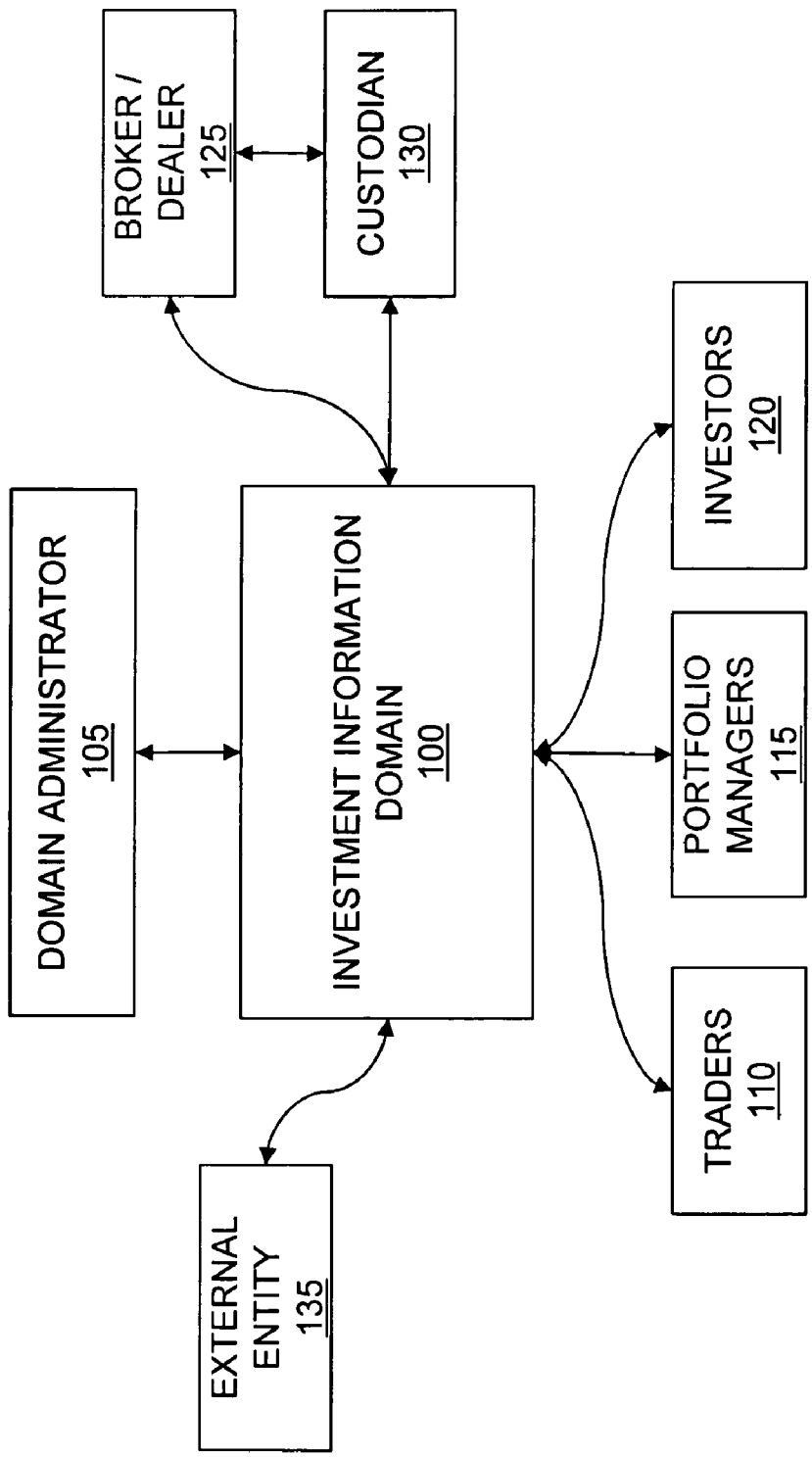
FIG. 1 is a block diagram of an investment information domain according to various embodiments of the invention.

Throughout the text, the following terms are used:

Securities: Any sort of investment including but not limited to stocks, equities, corporate and government bonds, commodities, mutual funds, fixed-income investments, exchange traded funds, futures, currency and derivatives thereof.

Portfolio Managers: In some embodiments, portfolio managers can be individuals or teams of individuals that have been identified as top performers in one or more virtual contests using manual trading and/or algorithmic trading techniques and manage portfolios of securities in the investment information domain, preferably according to a defined strategy and within certain guidelines. Portfolio managers may also be persons identified and/or selected by the domain administrator to take advantage of the community of traders and/or a library of developed trading algorithms to manage money on behalf of investors. As one non-limiting example, portfolio managers can be employees of the domain administrator that are hired to manage funds based on algorithms submitted by the traders.

Investment Information Domain: A compilation of individual investors, traders, portfolio managers, oversight, compliance and administrative staff, and the computerized systems to support their activities which may be operated by or on behalf of one or more investment advisor(s) (e.g., a registered investment advisor). In various embodiments, the domain facilitates competitions to identify top investment strategies, development of programmatic trading algorithms based on a domain-specific language ("DSL"), contracts with the portfolio managers that execute strategies, offers sponsorship and advertising opportunities to other entities, offers development services for the development of trading algorithms, provides systems and policies to assure proper compliance and oversight of the portfolio managers and algorithms, tracks the performance of the portfolio managers and algorithms, and acts as an intermediary among the portfolio managers, investors, custodians and brokers.

Investors: Individuals, groups, or entities with brokerage accounts at an existing brokerage house, or investors desiring to open such accounts for investing. Investors allocate funds in their account to one or more portfolio strategies and use the information and trade data provided by the investment information domain based on the buy and sell activities of portfolio managers and/or algorithms to effect trades in their accounts based on the strategies and performance of the portfolio managers, and/or algorithms.

Traders: Individuals or teams of individuals wishing to participate in a trading experience with the possibility of being invited to join the investment information domain as a portfolio manager, individuals that utilize the Investment Information Domain to develop one or more programmatic trading algorithms for personal use, use by portfolio managers, and other traders, and/or receive royalties based on the use of their trading algorithms, or in some cases, algorithms themselves that can be rated, ranked, participate in market activities and/or contests and fulfill the role of trader as used herein.

Domain Administrator: Manages the activities within the investment information domain, including user registration, performance measurement, implementation of rules, terms of use, awarding of prizes, calculation and distribution of license fees, and oversight of the software and hardware infrastructure to support the systems and methods described herein.

Broker: Receives and executes trades for portfolio managers and investors.

Custodian: Maintains accounts and holds funds for the investment information domain on behalf of the portfolio managers and the investors.

Referring to FIG. 1, in one embodiment, an exemplary investment information domain 100 is operated by (or on behalf of) a domain administrator(s) 105 responsible for the overall implementation and operation of the domain 100. The domain 100 provides the infrastructure, systems, communications and processing functionality that allows traders 110, portfolio managers 115 and investors 120 to participate in the investment information domain 100. In various embodiments, some traders 110 can be identified and/or selected by various methods from a distributed community of traders and/or the general public as traders that exhibit an ability to outperform other traders, for example, on a daily, monthly, quarterly or annual basis, and invited to join the domain as portfolio managers 115 who in turn manage money for the investors 120. For example, the traders 100 can be employees of, consultants to, or members of an organization, enterprise, or a community that provides investment advice, and in some cases the traders may have no other formal or informal relationship to each other. A broker/dealer 125 and custodian 130 provide back-office trading, record keeping, and settlement functions necessary to execute and account for the activities described herein. A single entity can, in some cases, provide the services of both the broker/dealer 125 and custodian 130. In some embodiments, an external entity 135 (e.g., a mutual fund company, institutional investor, individual investor or other group) can interact with the domain 100 and utilize the services of the domain 100. For example, an institutional investor may wish to use the algorithm development services (described below) to provide automated trading instructions for particular markets, or have access to the traders 110, the algorithms, or both. In certain cases, access to only exceptional algorithms and/or traders is offered to external entities, whereas in some embodiments all are available.

Figure 2:
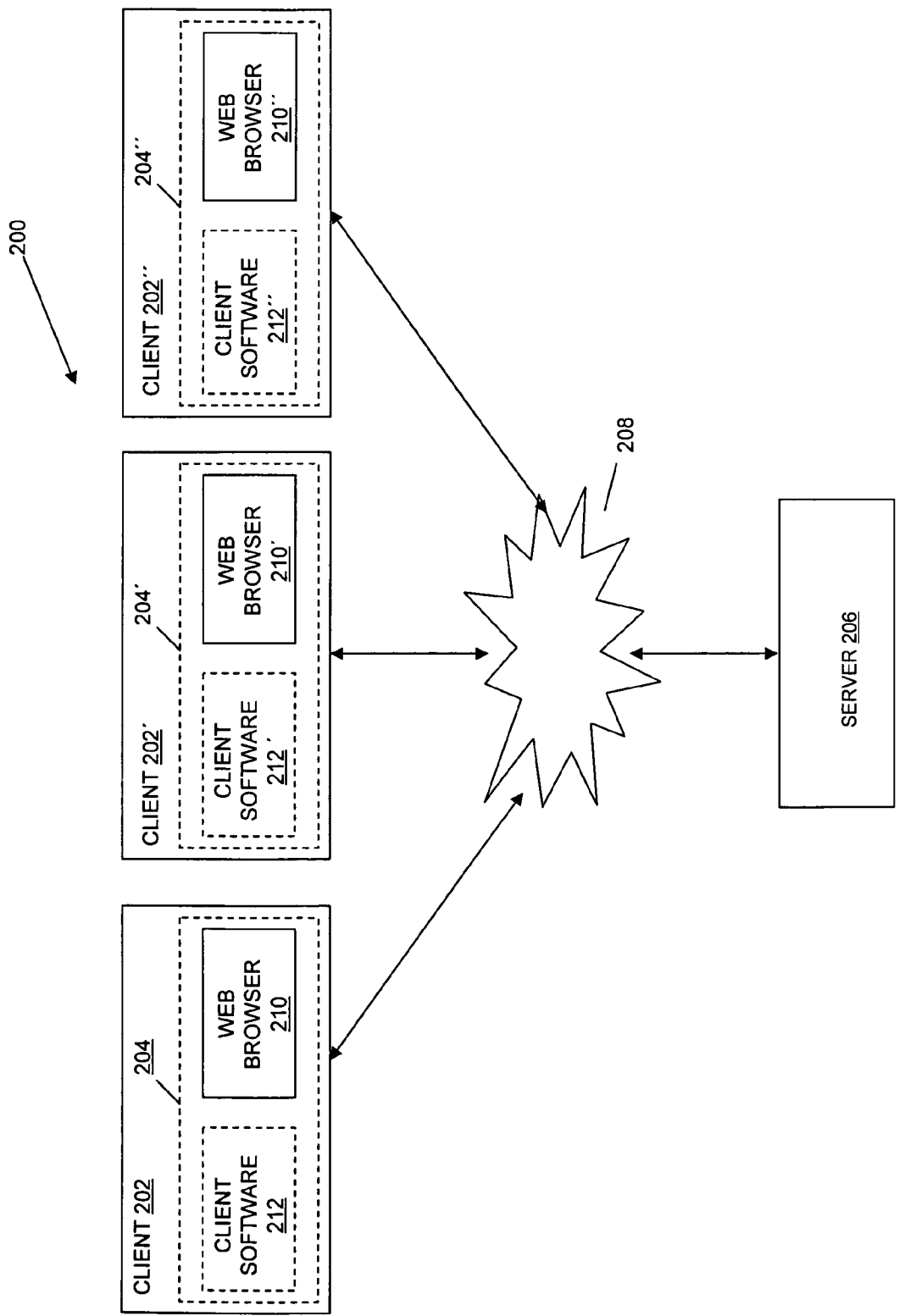
FIG. 2 is a block diagram of a system for implementing a distributed investment information domain according to various embodiments of the invention.

Referring to FIG. 2, in one embodiment, the investment information domain 100 includes an electronic information trading and algorithm development system 200 including at least one server 206, and at least one client 202, 202', 202", generally 202. In some embodiments, communication among the server 206 and one or more of the clients 202 utilizes a communications network 208. As shown, the system 200 includes three clients 202, but this is only for exemplary purposes, and it is intended that there can be any number of clients 202. The client 202 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 202 can also be implemented on such hardware as a smart or dumb terminal, network computer, wireless device, wireless telephone, information appliance, workstation, minicomputer, mainframe computer, or other computing device that is operated as a general purpose computer or a special purpose hardware device used solely for serving as a client 202 in the system 200.

Generally, in some embodiments, clients 202 can be operated and used by traders, portfolio managers, and investors to perform various activities within the investment information domain. Examples of trading activities include, but are not limited to researching various investment opportunities, sending trade orders, analyzing historical performance, exchanging investment ideas with other members of the domain, participating in investment contests, as well as others. Clients 202 can also be operated by third-party entities (e.g., brokers, custodians, etc.) that perform other administrative tasks for members of the domain. Such activities include using the clients 202 to receive and execute trade orders, facilitate oversight and compliance reviews, monitor trade activities, as well as other activities described herein. The clients 202 may also be operated by a facilitator, acting as an intermediary between the portfolio managers, investors, and the third parties.

In various embodiments, the client computer 202 includes a web browser 210, client software 212, or both. The web browser 210 allows the client 202 to request a web page or other downloadable program, applet, or document (e.g., from the server 206) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 202 manually requests a web page from the server 206. Alternatively, the client 202 automatically makes requests with the web browser 210. Examples of commercially available web browser software 210 are INTERNET EXPLORER, offered by Microsoft Corporation, NETSCAPE NAVIGATOR, offered by AOL/Time Warner, and FIREFOX offered by the Mozilla Foundation.

In some embodiments, the client 202 also includes client software 212. The client software 212 provides functionality to the client 202 that allows a portfolio manager, trader, or investor to participate in, supervise, facilitate, or observe the investment and trading activities described above. The client software 212 may be implemented in various forms, for example, it may be in the form of a Java applet that is downloaded to the client 202 and runs in conjunction with the web browser 210, or the client software 212 may be in the form of a standalone application, implemented in a multi-platform language such as Java or in native processor executable code. In one particular example, the applet may be implemented as an information screen within a separate application using, for example, asynchronous JavaScript and XML ("AJAX") such that many of the user-initiated actions are processed at the client 202. In such cases, data may be exchanged with the server 206 behind the scenes and web pages being viewed by users at the clients 202 need not be reloaded each time a change is made, thus increasing the interactivity, speed, and usability of the system 200. In one embodiment, if executing on the client 202, the client software 212 opens a network connection to the server 206 over communications network 208 and communicates via that connection to the server 206. The client software 212 and the web browser 210 may be part of a single client-server interface 204.

The communications network 208 connects the client 202 with the server 206. The communication may take place via any media such as standard telephone lines, a local or wide-area network (LAN or WAN links such as T1, T3, 56 kb, X.25), broadband connections (ISDN, Frame Relay, ATM), wireless links (cellular, 802.11, Bluetooth, etc.), and so on. Preferably, the network 208 facilitates the transmission of TCP/IP protocol communications and HTTP/HTTPS requests made by the web browser 210, and the connection between the client software 212 and the server 206 can be communicated over such TCP/IP networks. The type of network is not a limitation, however, and any suitable network may be used. Non-limiting examples of networks that can serve as or be part of the communications network 208 include a wireless or wired Ethernet-based intranet, LAN or WAN, and/or the global communications network known as the Internet, which may accommodate many different communications media and protocols.

The server 206 interacts with clients 202. The server 206 is preferably implemented on one or more server class computers that have sufficient memory, data storage, and processing power and that run a server-class operating system (e.g., SUN Solaris, GNU/Linux, and the MICROSOFT WINDOWS family of operating systems). Other types of system hardware and software than that described herein may also be used, depending on the capacity of the device and the number of users and the size of the user base. For example, the server 206 may be or may be part of a logical group of one or more servers such as a server farm or server network. As another example, multiple servers 206 can be associated or connected with each other, or multiple servers may operate independently, but with shared data. In a further embodiment and as is typical in large-scale systems, application software is implemented in components, with different components running on different server computers, on the same server, or some combination.

Figure 3:
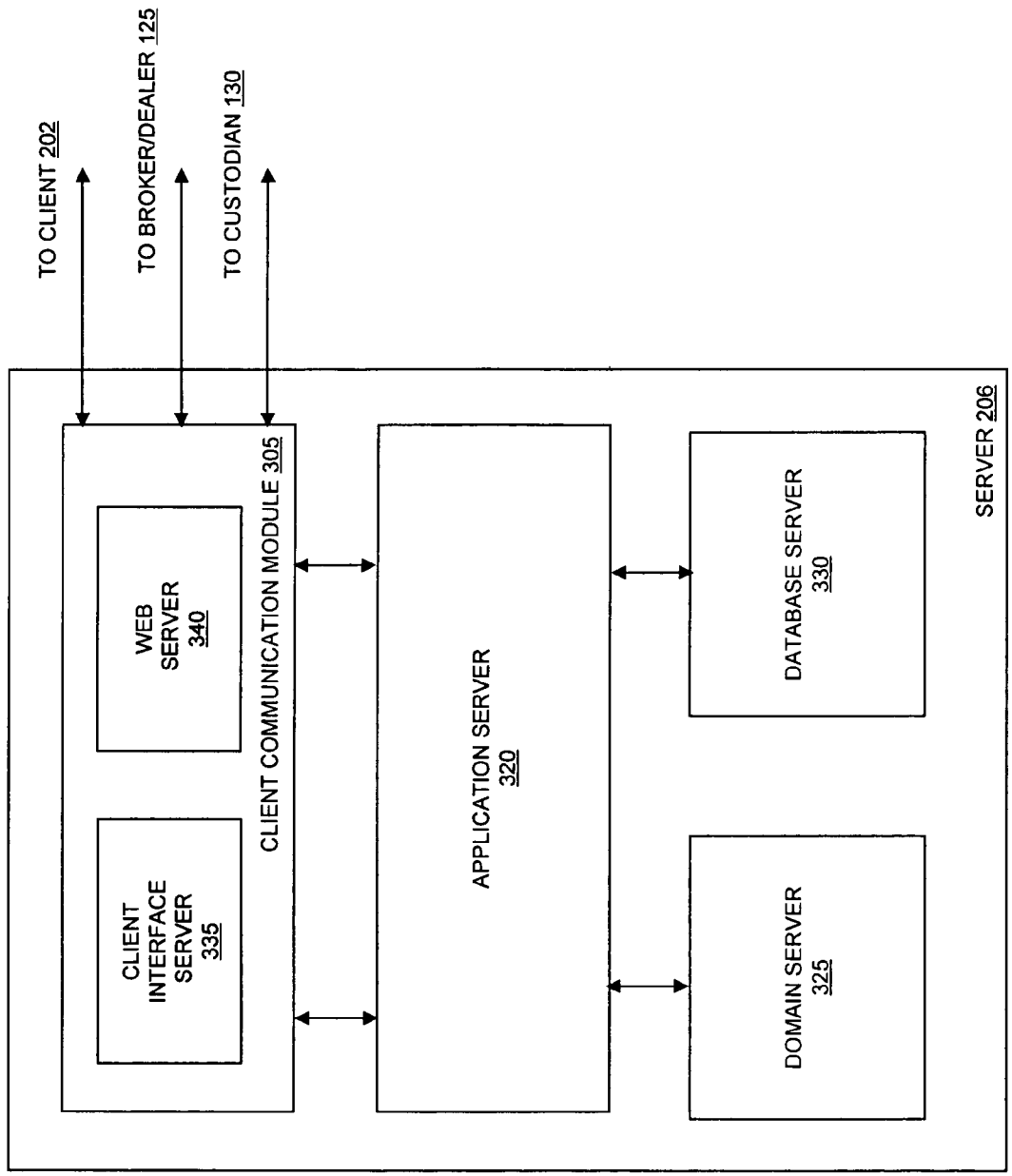
FIG. 3 is a block diagram of the server of FIG. 2 for implementing a distributed investment information domain according to various embodiments of the invention.

Referring to FIG. 3, in one embodiment, the server 206 includes a client communication module 305 that provides a communication interface with clients 202. The client communication module 305 can be implemented as software running on one or more servers, or may be implemented as a stand-alone server. In some embodiments, the client communication module 305 can provide an interface both to client software 212 and to a client web browser 210, so that, for example, a web browser 210 can be used by a trader to access investment information and/or performance data, and so on, while the client software 212 can be used, for example, for developing trading algorithms (described in greater detail below). The interface to each of the client software 212 and the client web browser 210 can be implemented separately or in combination. In other embodiments, the client communication module 305 can also communicate using other protocols or mechanisms.

The client communication module 305 communicates with the application server 320, which provides the main programming logic for the operation of the domain. In one embodiment, the application server 320 is implemented as one or more application programs running on a server class computer, which may be the same or different computer as the client communication module 305. The application server 320 receives queries from traders, portfolio managers, and others via the client communication module 305. The application server 320 also provides the infrastructure for implementing the trading competitions described below. For example, the application server 320 tracks the trading activities of the traders, matches trades, and in some embodiments executes the trades. As another example, in some embodiments the application server 320 may provide a qualifying test and/or a competition (either one-time, periodic or ongoing), as a preliminary requirement for being selected as a portfolio manager.

The server 206 also includes a domain server 325. The domain server 325 handles computationally intensive tasks associated with the trading competition and management of investments, for example, the periodic calculation of trader returns and execution of trading algorithms. In one embodiment, the domain server 325 also assigns ratings to traders, algorithms and portfolio managers. Generally, the interface between the application server 320 and the domain server 325 is designed such that the computationally intensive tasks are queued for processing on the domain server 325, thereby allowing the application server 320 to be responsive, even when facilitating numerous trading competitions.

The server 206, in some embodiments, also includes a database server 330, which stores data related to the trading competitions, market data, trader profiles, algorithms, ratings, license terms, as well as other data used by the domain server 325 and the application server 320. In certain embodiments, the database server 330 stores data related to the investment opportunities, user permissions, performance data, trading rules, account allocations, stored algorithms and access privileges associated therewith, and the like in one or more databases. For instance, the database server 330 may store information relating to the backgrounds of the portfolio managers, information about particular investment opportunities (or links thereto), stored content, user information and communication logs. The database server 330 may also contain separate databases for user data, account data, investment data, historical data (e.g., equity prices, trade records, market information, etc.) user permissions and security information, and others. The database server 330 provides data to the domain server 325 and application server 320 for inclusion in messages, web pages, stored procedures, and applications (both residing on the client and/or the server).

The data can, in some instances, be stored in one or more databases. The database server 330 can also store data relating the use and performance of the domain itself, such as server availability and web traffic information. Examples of database applications that can be used to implement the database server 330 include MySQL Database Server by MySQL AB of Uppsala, Sweden, the PostgreSQL Database Server by the PostgreSQL Global Development Group of Berkeley, Calif., and the ORACLE Database Server offered by ORACLE Corp. of Redwood Shores, Calif.

In one embodiment, the client communication module 305 includes a client interface server 335, which provides an interface for communications with the client software 212. In one embodiment, the client interface server 335 is a software module executing on a server computer 206. In another embodiment, the client interface server is a stand-alone server computer in communication with other components of the server 206, such as the application server 320. In one embodiment, the client interface server 335 communicates with the client software 212 using a messaging protocol that runs over TCP/IP for communications between the client software 212 and the client interface server 335. The client interface server 335 is designed to maintain communications with the client software 212 of a large number of clients 202. In some embodiments, the communication server is or operates as part of the server 206 as described above, whereas in other cases the communication server may be a separate server, which may be operated by and/or outsourced to an application service provider (ASP), internet service provider (ISP), or other third-party. In various embodiments, the communication server facilitates HTTP/S requests and responses, Java messages, SMTP messages, POP3 messages, instant messages, RSS feeds, as well as other electronic messages exchanged among users of the investment information domain.

In some embodiments, the client 202 may communicate with the server 206 via a web browser 210. In such an embodiment, the communication module 305 also includes a web server 340. The web server 340 delivers web pages to the client 202 and provides an interface for communications between the web browser 210 and the server 206. Preferably, the web server 260 is an enterprise class web server, such as APACHE from the APACHE FOUNDATION, INTERNET INFORMATION SERVER from MICROSOFT CORPORATION, or NETSCAPE ENTERPRISE SERVER from NETSCAPE COMMUNICATIONS CORPORATION, running on one or more server class computers, which may be the same or different computers than the client interface server 335. The web server 340 may be implemented as any communications device that is capable of serving web content to client web browsers 210 over the communications network 208, and communicating with the other parts of the server 206, such as a personal computer, web appliance and so on. The web server 340 and the client interface server 335 are each in communication with the application server 320.

Figure 4:
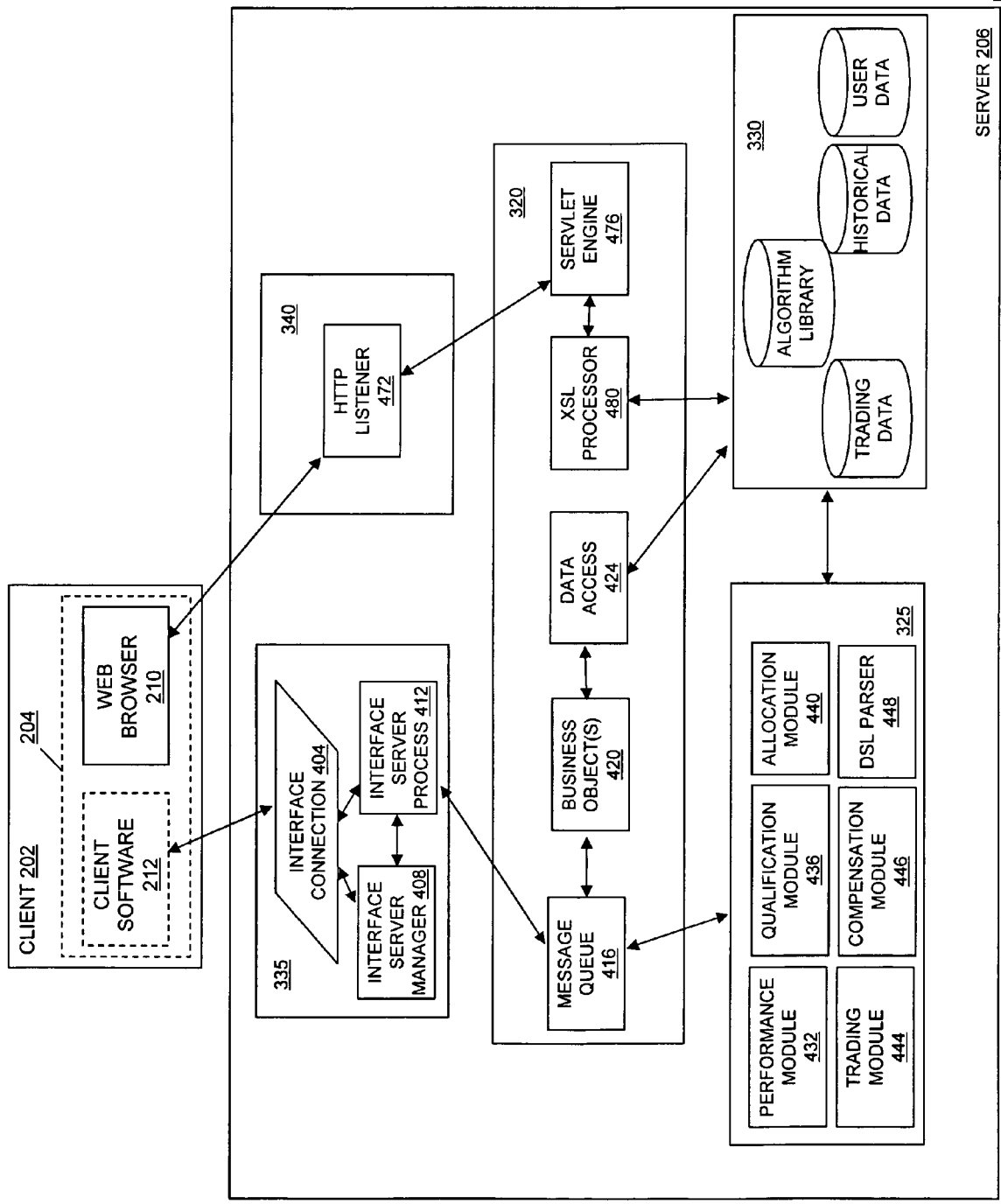
FIG. 4 is a more detailed diagram of the server of FIG. 2 for implementing a distributed investment information domain according to various embodiments of the invention.

Referring to FIG. 4, the client interface server 335 includes an interface connection 404, which provides the actual interface to the client software 212. The interface connection 404 receives messages from the client software 212 and provides them to an interface manager 408 and an interface server process 412. Likewise, the interface connection 404 receives messages from the interface server manager 408 and the interface server process 412 and communicates those messages to the client software 212.

The interface server manager 408 manages the allocation of the interface connection 404 and the interface server process 412 to each instantiation of client software 212. Each time a client 202 (via client software 212) connects to the server 206 (via client interface server 320), individual processes are assigned that exist for the life of the client's connection. The interface server manager 408 handles this assignment process. The interface server manager 408 also stores information regarding the number and nature of the client connections.

The interface server process 412 acts as the interface from the client interface server 320 to the application server 320. The interface server process 412 communicates with the client software 212 at a higher level (the application layer) than the interface connection 404 (typically the session layer. The interface server process 412 also communicates with the interface server manager 408. For example, the interface server manager 408 may instruct the interface server process 412 to obtain a particular application from the application server 320 for use in a trading competition, for calculating performance metrics or processing trades.

Thus, when a trader wants to transmit a request (e.g., a trade instruction to the server 206), the client software 212 transmits the request over the communications network 208. The client software 212 communicates with the interface connection 404 to enable communication with the interface server process 412. The interface server process 412 receives the request from the interface connection 404 and determines what needs to occur to handle the request. The interface connection 404 also communicates the request to the interface server manager 408 as necessary to properly manage and allocate resources of the client interface server 206 to handle the request.

The interface server process 412 then transmits the request to the application server 320. The application server 320 includes business objects 420 to process the request. Each business object 420 manages one or more clients 202. Business objects 420 communicate with the client software 212 via the interface server process 412. Business objects 420 process requests from the client software 212. Examples of the implementation of a business object 320 include, for instance, a Component Object Model (COM) object, an Enterprise Java Bean (EJB) object and a .NET object.

If a request requires data access, the business objects 420 make requests, via a data access layer 424, to the database server 330. If the requests require processing by the domain server 325, the requests are passed on to a message queue processor 416, which queues requests for operation by the domain server 325, and sends the results back to the client software 212 via the interface server process 412.

In one embodiment, the domain server 325 can include one or more of a performance module 432, a qualification module 436, an allocation module 440, a trading module 444, a compensation module 446 and a DSL parser 448. The performance module 432 provides the functionality for computing one or more performance metrics for the traders during the qualification phase as well as the portfolio managers during the trading phase. The qualification module 436 provides the processing logic to facilitate the membership, market simulation and trading features described below to determine which traders are invited to join the domain as portfolio managers based, for example, on their performance in a virtual investment contest. The allocation module 440 allows investors to establish, alter, and delete the links between their investment accounts to the one or more portfolio managers and the associated investment strategies. The allocation module 440 also allows investors to create trading rules, such as those described below, that, when active, are used to instruct the application server and to execute (or not execute) trades. The trading module 444 receives and reviews the trade orders from the portfolio managers, assures the trades meet any relevant compliance rules, receives an indication of the investor accounts that are linked to the portfolio manager requesting the trade and any necessary adjustments (if necessary) from the allocation module 440, and formats the trade data for transmission to the broker via the communications module 305. The trade data can be transmitted using, for example any one of or a collection of various electronic data exchange methods such as application programming interfaces and XML/SOAP/Web Services, etc.

In some embodiments, the server 206 also includes a royalty module for calculating royalties for individual traders based on the submission and use of their algorithms. For example, the traders can receive a license fee and/or royalties based on the number of portfolio managers that have selected their algorithm(s) for inclusion in an overall portfolio strategy, the management fees received from investment vehicles based on the algorithms, and the like. In some embodiments, a fee is paid to the trader when they submit their algorithm to the domain, and/or each time one of their algorithms is selected by a portfolio manager. In other cases, the fees can be based at least in part on the performance of the algorithm itself and/or the portfolio in which it is deployed.

The DSL parser 448 provides the functionality for interpreting a domain specific language (referred to herein as "DSL" and described in greater detail below) as used to develop the trading algorithms. In some embodiments, the DSL parser 448 is a java application. For example, the parser can utilize a parser generated by a parser generator (e.g., JavaCC) to read a grammar specification and convert the specification to a Java program that can recognize matches to the grammar. In addition, the parser can use a preprocessor such as JJTree to facilitate tree building, actions, debugging, and other functions.

Although described above as independent subsystems and modules, this is for exemplary purposes only and these subsystems and modules may alternatively be combined into one or more modules or subsystems. Moreover, one or more of the subsystems described above may be remotely located from other modules (e.g., executing on another server 206 in a server farm). Likewise, the investment information domain can be implemented with one or any number of servers, connections and interactive network components.

The web server 340 provides the interface for web browsers 210 residing on the clients 202 to communicate with the server 206. The web server 340 includes an HTTP listener 472 that receives HTTP requests from the web browser 210 and transmits HTTP replies to the browser 210. The HTTP listener 472 communicates with the application server 320 via a servlet engine 476.

The application server 320 communicates with web browsers 210 via the servlet engine 476. The servlet engine 476 can use, for example, Java servlets to generate web pages in response to web page requests. An XSL processor 480 interprets XSL style documents, which are used by the servlet engine 476 to produce HTML documents. Data requests are made by the servlet engine 476 to a business object 420, which makes data requests, if necessary, via the data access layer 424 to the database server 330. The servlet engine 476 combines XML objects and XSL style files to produce HTML files, which are then communicated, via the web server 340, to the browser 210.

The de-coupling of these computation-intensive tasks in the domain server 325 from the operation of the other servers allows for scalability of the system. Any combination of the servers, processors, or engines (e.g., web server 340, application server 320, message queue processor 416, and domain server 325) can be implemented on the same or independent processors or computers relative to the other servers, processors, or engines. Several instances of the domain server 325 can execute in parallel (on the same or different computers) to respond to requests from the message queue processor 416. Additional processing capacity can be added quickly to handle these tasks more quickly if the system comes under heavy load, as could happen during the administration of multiple competitions, and/or days in which the trading volume is heavy. Thus, a useful feature of this embodiment of the server 206 is that it can reliably support a computation-intensive competition with large numbers of traders, algorithms, and portfolio managers operating simultaneously.

Figure 5:
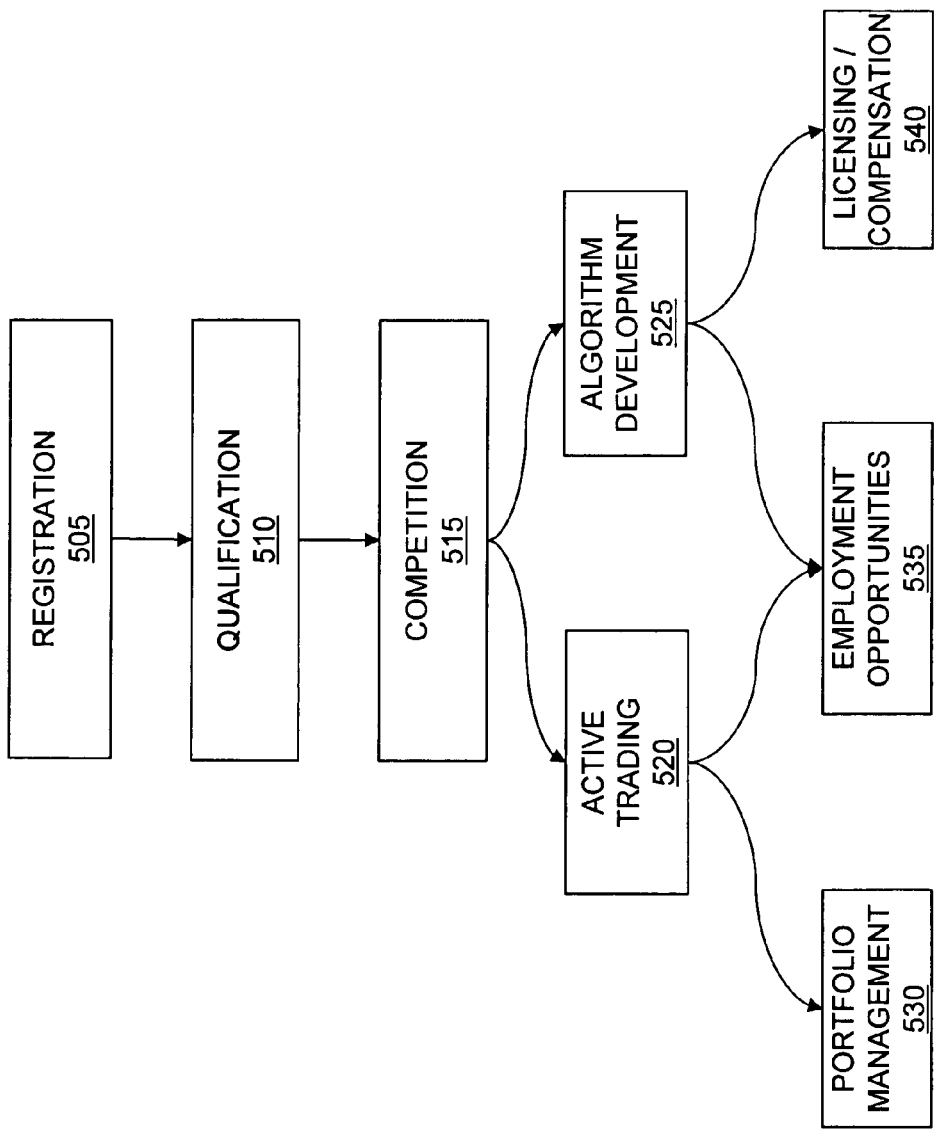
FIG. 5 is a flow chart depicting, in summary, a process for using the investment information domain to identify exceptional traders and offer investment opportunities based on the traders' strategies in accordance with one embodiment of the invention.

FIG. 5 illustrates at a summary level the activities of traders and portfolio managers within some embodiments of the investment information domain. In general, the steps involved for users to gain access to the various opportunities presented by the domain include a registration step 505, a qualification step 510, and a competition step 515. In some embodiments, the competition step 515 can include active trading competitions 520, algorithm development competitions 525, or in some cases, both. For example, in an active trading competition traders review market conditions (either current or historical, and either real or simulated) and make active decisions regarding trades. Conversely, in an algorithm development-based competition, the traders develop programmatic algorithms that, based on strategic trading rules described in the algorithm, automatically provide trading instructions. Those traders participating in the active trading competitions 520 that exhibit exceptional performance (e.g., absolute returns, returns relative to peers, returns relative to indices, etc.) or show particular capabilities in certain market segments may be then provided with opportunities to manage a portfolio 530 and/or presented with employment opportunities 535 such as consulting engagements and positions for full-time employment. In embodiments in which traders compete based on the performance of algorithms they develop, the algorithms may be used by other portfolio managers (or, in some cases, traders) as part of an overall market strategy, in which case the trader (or traders) that developed the algorithm may receive compensation 540, such as prizes, cash payments, licensing revenue, merchandise, and the like.

Traders optionally register with the investment information domain. Preferably, the traders provide membership information about themselves during the registration step 505. Examples of membership information can include such information as the trader's name, contact information (i.e., mail address, telephone number, email address), a username (e.g., an "alias" or "handle") for use on the site, work experience, education background, certain demographic information, specific technical skills, whether the trader is currently seeking a job, whether the trader is employed by an institution involved in trading securities, user authentication information, notification preferences, and/or geographic preferences of the trader for employment. The username is how the trader will be known within the domain to other traders, portfolio managers, and investors. The registration may also include, for instance, each trader completing a qualifying test, or qualifying round to assure that the traders possesses a minimal amount of knowledge about the financial markets or other subjects related to investing. The registration may include providing enough information to conduct a background check for past criminal or illicit activity. In some embodiments, a user is not registered until a background check is performed and the results of the check are satisfactory.

After registering, traders attempt to qualify to become portfolio managers by participating in one or more virtual trading events. One such event, for example, is a virtual investment contest using, for example, a simulated stock market environment. In one embodiment, contests are ongoing and held continuously. In other embodiments, contests are held at set times and for set durations. Some contests may be limited to certain types of securities or strategies (e.g., large cap equities), time frame (e.g., quarterly, annual, or intra-day), or in some instances a combination of the two. By assigning one or more parameters to the contests (such as fixed durations) and using those parameters to measure the performance of the traders, a more accurate indication of a trader's ability to outperform other traders and/or market metrics can be determined. For example, one trader may generate an exceptional performance rating in a contest with a time from of six months that focuses on large-cap equities, and lower ratings in an intra-day contest that focuses on penny stocks or shorting stocks. Thus, the performance ratings of traders can be analyzed in the context of the contest(s) in which they participate.

In one embodiment, traders may enter a contest at any time. For example, a trader may enter a contest at that time if there are other suitable traders available to compete. In one embodiment, this type of competition is referred to as a "pick-up" competition because a trader can enter the contest at any time that other traders are available. Contests may be scheduled to begin the competition at a set time (or some predetermined delay after the predetermined time).

Qualification events may be setup as either practice events or rated events. Practice events allow traders to become familiar with the event environment and rules. The results of the practice events may, in some cases, not be used to measure the performance of the traders, but will still allow a trader to perform the functions available in a rated event. In some embodiments, the practice events will allow traders to "reset" their portfolios back to a starting balance during or after the event.

Traders' performance in rated events (or in some cases, the performance of algorithms developed by the traders, as described in greater detail below) may be tracked, measured, and used to calculate an overall rating for the trader. In some embodiments, traders are permitted to participate in more than one event simultaneously. Rated events may be classified as private, such that only those traders that have been invited (by, for example, the domain administrator or another trader) can participate in and/or view the event results, whereas other events may be public. In some embodiments, traders may search for events using one or more characteristics of an event, for example, an ID, another traders' handle, the investment style of the event, and the start and/or end dates of the event. Traders may also be invited to participate in events. Invitations to events may include any of the event characteristics mentioned above, as well as other traders participating in and/or invited to participate in the event. Traders may accept or decline an invitation.

In some embodiments, a trader may view a "my competitions" screen, that lists the events in which they are participating, those that they are invited to join, upcoming events meeting one or more search/filter criteria, as well as their updated performance statistics and rating.

Qualification events generally involve each trader receiving a bankroll of virtual money that can be invested (or held) over the period of the event. In addition, changes in the investment mix of each trader's virtual portfolio can change during the event in response to trade orders generated by the trader. Any suitable mechanism can be used to initiate trade orders. For example, trade orders may manually initiated by sending an email to the investment information domain trading system requesting the purchase or sale of a security, or through the use of a web-based trading interface.

At the end of each event (or in some cases at set times during an event), the performance of each trader is calculated. Performance can be calculated using one or more formulae, depending, for example, on the time period and universe of investment opportunities available to the traders. In some embodiments, the performance is based on a strict rate of return calculation by dividing the difference between the account value at end of the event and at the start of the event by the account value at the start of the event and multiplying the result by 100. In some cases, a commission is charged to simulate trading commission charged by brokerage firms. For example, where each trader is given a virtual account of $10,000, and a particular trader's portfolio value was $12,500 at the end of the event, their rate of return would be 100× [($12,500−$10,000)/($10,000)], or 25%. In other embodiments, performance may be calculated using a risk-adjusted and/or weighted rate of returns, such as an alpha or beta coefficient that incorporates the volatility of the underlying investments in comparison to the market as a whole. For example, the a coefficient for a portfolio can be calculated over time by using a formula such as [(sum of y)−((β)(sum of x))]/n where n=the number of observations (e.g., 36 mos.), β=the beta coefficient of the fund (a measure of the fund's sensitivity to market movements by measuring the relationship between a fund's excess return over T-bills and the excess return of a benchmark index), x=the rate of return for the market, and y=the absolute rate of return for the fund. Other performance measurements may also be used as appropriate, such as comparisons to certain benchmarks (e.g., S&P 500, Russell 2000) and other investment vehicles available to the public.

In some embodiments, a rating is calculated for the traders. The rating may depend on, for example, the type of event, the number of other traders participating the event, a trader's previous rating, and the previous ratings of the other traders participating in the event. In one embodiment, the ratings may be based on points awarded to the participants in the event based on their performance in the event.

In one embodiment, after the completion of one or more events, the traders are assigned ratings. Typically the assignment of a rating occurs when an event completes, where an event may include one or more competitions. For example, a competition may consist of one round, whereas an event may also consist of multiple rounds, such as in a tournament. Thus, in embodiments in which traders are rated based on the results of one contest a rating is assigned to each trader after calculating the performance of each trader. In embodiments in which the event includes multiple contests (e.g., a tournament), the ratings are assigned to traders after the completion of each round of the tournament and/or the end of the tournament. In one embodiment, the ratings for an individual trader (or a team of traders) is calculated using Equation 1 below:

$$\text{Rating} = \frac{\text{return}}{\text{RiskFactor}} \qquad \text{Equation 1}$$

where Return is a measure of the trader's portfolio's return starting from the beginning of the competition, and RiskFactor is a measure of the portfolio's volatility. In one example, Return is calculated using Equation 2:

$$\text{return} = 100 \times \frac{\text{EndValue} - \text{StartValue}}{\text{StarValue}} \qquad \text{Equation 2}$$

The ratings provide a metric that can be used to chart a trader's skill, knowledge, and ability. As described in more detail below, in one embodiment the trader's rating is based on the total number of points awarded to the trader during the competition (e.g., having one or multiple rounds). The rating can be a score, a grade, or any other type of rating technique.

In some embodiments, a rating can be calculated for an algorithm. For example, a trader may design an algorithm and submit the algorithm to the investment domain for execution during one or more virtual competitions and/or to support actual trading. In this manner, algorithms can effectively "exist" as traders separate and distinct from the human trader or traders that designed the algorithm. The algorithms can then "compete" against each other, and achieve similar ratings and rakings as the human competitors, and the top performing algorithms can be identified.

In some embodiments, a trader's rating can be based on a combination of the ratings of the algorithms they submitted. For example, a trader can submit numerous algorithms for different trading strategies, market conditions, investment vehicles, etc., each being "rated" against other algorithms having similar characteristics, or, in some cases, against all other algorithms. The rating for each submitted algorithm can then be used to compute an overall rating for the trader. In some cases, the ratings can be weighted (e.g., more recent submissions rated higher than previous submissions) or averaged to compute the overall rating. A trader's competition rating can be combined with the ratings achieved by her algorithms into an overall rating.

In one embodiment, the registration process includes seeding each trader into a division. In one such embodiment, two divisions are initiated, a first division for traders who have previously participated in an event, and a second division for traders who have either not attained a rating (i.e., who have never competed before or have no data associated with a competition) or have a rating below a predetermined division rating. In one embodiment, the parameters of the qualification events for the second division are different from the parameters for the first division.

For example, a predetermined division rating value of 1200 may be used such that all traders who have a rating less than 1200 are placed into the second division and all traders who have a rating greater than 1200 are placed into the first division. Moreover, in one embodiment, traders may be reassigned after the completion of an event. Thus, after an event, if a trader previously in the first division has a rating below 1200 after this event, the trader may be reassigned to the second division.

The divisions may be further divided up into one or more "rooms" or group of rooms. For example, the second division may be divided into unrated rooms having only traders who have never been assigned a rating, and rated rooms having traders who have been assigned a rating below the predetermined division rating for the first division.

Once some or all of the competition is complete (e.g., one round or multiple rounds), each trader's rating is calculated. In one embodiment, to determine a traders rating, the trader's previous rating is used if the trader has been rated previously. The rating may include a rating value and a volatility value. The volatility value indicates the consistency of the trader's rating over time.

In one embodiment, each trader has a rating and a volatility score. This may be determined as follows.

In one embodiment, the average rating for the contestants participating in a competition is calculated using Equation 3:

$$AvgRating = \frac{\sum_{i=1}^{NumTraders} Rating_i}{NumTraders} \quad \text{Equation 3}$$

A competition factor for the events may also be calculated using Equation 4:

$$CF = \sqrt{\frac{\sum_{i=1}^{NumTraders} Volatility_i^2}{NumTraders} + \frac{\sum_{i=1}^{NumTraders}(Rating_i - AvgRating)^2}{NumTraders - 1}} \quad \text{Equation 4}$$

In Equations 3 and 4, NumTraders is the number of traders in the event and $Rating_i$ is the rating without the volatility of the $i^{th}$ trader in the event before the event. Further, $Volatility_i$ is the volatility of the $i^{th}$ trader in the event before the event.

Next, the skill of the trader is calculated, using, for example, Equation 5.

$$Skill = \frac{Rating - 1200}{1200} \quad \text{Equation 5}$$

Rating is the traders rating before the event, at any point during the event, or a previous rating. In one embodiment, if the trader has not been previously rated, no skill level is calculated. In a further embodiment, a predetermined skill level may be assigned to a trader (e.g., 1). The deviation of a trader from other traders may be calculated, for example, using Equation 6, where Volatility is the volatility of the trader before the event:

$$Deviation = \frac{Volatility}{1200} \quad \text{Equation 6}$$

The probability ($WP_i$ for i from 1 to NumTraders) of awarding a trader a higher score relative to the other traders in the event can then be calculated. In one embodiment, this probability is estimated by using the trader's expected performance rating on a range of good to bad days. For example, each trader's performance as a normal distribution with a mean (the rating) and standard deviation (the volatility). Using this model, a trader's performance can be expressed as a percentage using the normal distribution, so that 50% represents expected performance and 25% represents better three days out of four, etc. Then, to estimate the probability that a particular trader beats trader i, the range from 0% to 100% is divided into 1% blocks, and the corresponding performance is computed for each midpoint. The win probability is the number of blocks where the midpoint favors trader i. If two traders have the same number of blocks in which the midpoint favors one trader (i.e., a tie), the block is split between both traders.

In one implementation, the pseudo-code function to estimate the probability of trader A beating trader B, where f is the inverse of the standard normal function, is shown below:

WinProbability (SkillA, DeviationA, SkillB, DeviationB)
    Set count, a, b to 0. Set fa=SkillA+f((a+0.5)/100)*DeviationA
    Set fb=SkillB+f((b+0.5)/100)*DeviationB.
    While (a<100):
    If fa<fb:
        Add 100−b to count, Increment a,
        Set fa=SkillA+f((a+0.5)/100)*DeviationA,
    If fa=fb:
        Add 100−b−0.5 to count, Increment a, Increment b,
        Set fa=SkillA+f((a+0.5)/100)*DeviationA,
        Set fb=SkillB+f((b+0.5)/100)*DeviationB
    If fa>fb:
        Increment b
        Set fb=SkillB+f((b+0.5)/100)*DeviationB
    Return count, where count is the win probability.

The expected rank of the trader is then calculated using Equation 7:

$$ERank = \sum_{i=1}^{NumTraders} WP_i \quad \text{Equation 7}$$

Where $WP_i$ is the Win Probability of a trader against each other trader. The expected performance of the trader may then be calculated using Equation 8:

$$EPerf = -\Phi\left(\frac{ERank - .5}{NumTraders}\right) \quad \text{Equation 8}$$

In Equation 8, $\Phi$ is the inverse of the standard normal function. The actual performance of each trader is then calculated using Equation 9:

$$APerf = -\Phi\left(\frac{ARank - .5}{NumTraders}\right) \quad \text{Equation 9}$$

In Equation 9, ARank is the actual rank of the trader in the event based on score (1 for first place, NumTraders for last place). If the trader's score was equal to another trader, the rank is the average of the positions covered by the tied traders. The "performed as" rating of the contestant may then be calculated using Equation 10:

$$PerfAs = OldRating + CF*(APerf - EPerf) \quad \text{Equation 10}$$

The weight of the competition for the trader is calculated using Equation 11, and a rating cap for the trader using Equation 12:

$$\text{Weight} = \frac{TimesPlayed + 1}{.75 * TimesPlayed + .4} - 1 \qquad \text{Equation 11}$$

$$\text{Cap} = 150 + \frac{1500}{1 + TimesPlayed} \qquad \text{Equation 12}$$

In Equation 11, TimesPlayed is the number of times the trader has been rated before. In one embodiment, to stabilize the higher rated traders, the Weight of traders whose rating is between 2000 and 2500 is decreased 10% and the Weight of traders whose rating is over 2500 is decreased 20%. A new volatility of the trader may then be calculated using Equation 13 and the new rating of the trader calculated using Equation 14:

$$NewVolatility = \sqrt{\frac{Volatility^2 + \text{Weight} * (CF * (APerf - EPerf))^2}{1 + \text{Weight}}} \qquad \text{Equation 13}$$

$$NewRating = \frac{Rating + \text{Weight} * PerfAs}{1 + \text{Weight}} \qquad \text{Equation 14}$$

In one embodiment, if |NewRating−Rating|>Cap, NewRating is adjusted so that it is at most Cap different than Rating. In some embodiments, any of the above mentioned values, such as the Rating, Volatility, and Number of times previously rated may be stored in a database and/or server.

Thus, in the embodiment just described, a trader's rating is not adjusted drastically from one performance in an event if the trader has performed and been rated in many other trading competitions or rounds of trading competitions. A maximum rating increase may also be calculated for each trader to help stabilize a trader's rating from one event to another. As described above, a similar technique can be used to calculate a new rating for algorithms, which can be published in the investment information domain. In one embodiment, traders' ratings are displayed on a web site of the investment information domain.

Once sufficient performance data has been compiled on the traders during the virtual qualification event, those traders that consistently outperform their peers are identified. If otherwise qualified, these traders may be invited to join the investment information domain as portfolio managers and provided with accounts and real money to be invested according to the strategies and algorithms used during the qualification events and/or newly developed strategies. In the examples below, stocks are used as the exemplary investment vehicle of choice, however it should be understood that any number and/or type and/or combination of securities can be included in the investment strategies and accounts of both the traders and investors.

In addition to or instead of manual trading, some or all of a trader's trade orders may be automatically generated based on programmatic trading algorithms. The trading algorithms may operate as autonomous programs that act as agents for the traders, actively monitoring and processing market conditions specified by the traders and producing trade orders based on the algorithm. Traders may, in some cases, participate in more than one qualification event using different strategies and algorithms in an attempt to determine which algorithm performs best under certain market conditions and to hone the accuracy of the algorithms. The parameters of the qualification event employ many of the same rules and constraints imposed on actual investors such as trading fees, minimum order sizes, and the like so that the results of the qualification phase provide an accurate indication of how a particular trader will perform when actually investing.

The investment information domain also supports algorithm trading, using, for example, automated trading techniques that store, execute and track the performance of the algorithms using the methods described herein. The investment domain automatically monitors and executes the algorithms using historical data or real-time data which may be either simulated or real, to generate trading instructions that may be executed on behalf of a trader, a group of traders or one or more portfolio managers, in some cases without the need for human interaction. The trade orders generated in response to the trading instructions then propagate through the domain and are applied to the portfolio or the investor accounts associated with the individual traders and/or portfolio managers. In some embodiments, the portfolio managers and/or investors can download or develop the trading algorithms on their client machines for local operation and interface with the investment information domain to transmit trade instructions. For example, the investment information domain may expose an application programming interface (API), use XML, SOAP, Web Services, or any combination thereof to receive trading instructions. In some cases, trading algorithms are hosted within the investment information domain and run centrally. By facilitating algorithmic trading, the domain provides a mechanism for traders to develop, test, hone and implement their trading strategies without succumbing to emotional, often irrational trading, and frees the trader from having to continuously monitor the market in order to effectuate their particular strategies. The algorithms also provide an opportunity for those traders who may not wish to actively participate in the market to reap the benefits of their particular strategies by receiving compensation (e.g., money, merchandise, etc.) in exchange for use of their algorithms by other traders and/or portfolio managers.

In some embodiments, the investment information domain provides tools such as a trade algorithm wizard that enables traders to define an algorithm by, for example, specifying filters and constraint conditions based on one or more factors. In some cases, a domain-specific language (DSL) is provided to the traders that facilitates programmatic development of algorithms that will autonomously execute trades within the investment domain without human interaction. The DSL includes constructs and operations that are generic to financial markets, as well as those that are specific to the trading domain, and provides traders with pre-defined abstractions and notations that facilitate the development of algorithms using both common and user-defined functions. The structure of the DSL, as well as the use of machine-recognizable keywords and operators that are common parlance among traders allows traders that may not have significant (or in some cases any) programming skill the ability to implement a comprehensive, quantitative trading strategy.

In one example of a DSL, an algorithm is constructed from one or more "strategies" with each strategy including one or more lot instructions, which in turn can include one or more ticker symbols (or other moniker used to identify an investment vehicle), an order size that indicates the number of shares, lots, or other units to trade, an interval (e.g., minutes, ticks, hours, days etc.), an open position instruction, and a close position instruction. The open position instruction includes a form of a buy order (e.g., market, good till close, etc.) and can be further limited by conditional statements that are evaluated at each tick of the market. For example, the strategy shown below will buy shares of EBAY at the market price if its relative strength index is less than 20, the close is greater than its 50 day moving average, and the 50 day average is greater than the 200 day average.

```
Strategy Example4 ('EBAY') using 5-Minute intervals:
    BuyCondition:
        RSI < 20 and
        Close > 50DayAverage and
        50DayAverage > 200DayAverage
    BailOutCondition:
        Time > 3:55
    Lot A:
        OrderSize:
            MaxOrderSize
        OpenPosition:
            Buy Market when BuyCondition else
            None
        ClosePosition:
            Sell Market when BailOutCondition else
            Sell OCO(BuyPrice + 2, BuyPrice − 2)
    EndLot
EndStrategy
```

Similarly, the close position instruction includes a sell instruction that indicates when the position is to be closed. In the example above, the algorithm will initiate a sell order for the entire lot just prior to market close (i.e., 3:55 pm Eastern Time) or, alternatively, if the price rises or falls two dollars. In some examples, a strategy may also include an activation parameter that must evaluate to "TRUE" in order for the strategy to execute. For example, the script below provides the instructions for buying the maximum available shares of MSFT, GOOG an AAPL, waits 30 minutes, and then sells the shares:

```
Strategy Example3 ('MSFT','GOOG','AAPL') Using 1-Minute Intervals:
    Lot A:
        OrderSize: MaxOrderSize
        Activation: CloseDuration >= 30 Minutes
        OpenPosition: Buy Market
        ClosePosition: Sell Market when OpenDuration >= 30 Minutes
    EndLot
EndStrategy
```

The DSL can also provide for multiple lots, and in some cases the execution (or non-execution) of a lot order can be dependent on other lots. For example, the strategy shown below includes two lots that have different lot sizes, open positions, close positions and activations, each of which can include expressions that are contingent upon the other lot. More specifically, the activation of the open position order for lot 1 is dependent upon the execution of the order for lot 2, and will not execute until thirty minutes after lot 2 is sold.

```
Strategy Example5 ('EBAY','YHOO','COST','CPWM') using 1-Minute
intervals:
    BuyCondition:
        RSI < 20 and
        Close > 50DayAverage and
        50DayAverage > 200DayAverage
    BailOutCondition:
        Time > 3:55 or
        (BuyingPower < 10000 and OldestLotToday == CurrentLot)
    Lot Trade1:
        OrderSize:
            100 when Close > 50 else
            200 when Close > 30 else
            10000 / Close
        Activation:
            Time > SellTime + 30 Minutes and
            PositionSize in lot Trade2 == 0 and
            Time > SellTime in lot Trade2 + 30
        OpenPosition:
            Buy Limit(Close) when BuyCondition and
                DayProjectedVolume > 10DayAverageVolume else
            Buy Market when BuyCondition else
            None
        ClosePosition:
            Sell Market when BailOutCondition else
            Sell OCO(BuyPrice + 2, BuyPrice − 2)
    EndLot
    Lot Trade2:
        OrderSize:
            100
        Activation:
            Time > SellTime + 30 Minutes
        OpenPosition:
            Buy Market when Close < BuyPrice in lot Trade1 − 1.0 and
                PositionSize in lot Trade1 > 0
        ClosePosition:
            Sell Market when BailOutCondition else
            Sell OCO(BuyPrice + 2, BuyPrice − 2)
    EndLot
EndStrategy
```

Descriptions of exemplary data fields available in one particular embodiment of the DSL are described in Table 1 below. Such fields can be reserved within the DSL such that the DSL parser recognizes the fields within an algorithm and extract one or more parameters (that may, for example, follow the field) and use the parameters to effectuate trading strategies.

TABLE 1

| Field Name | Description |
| --- | --- |
| Time | The current date and time. During a backtest, this should be set to EndTime, the end of the interval. |
| DayOfWeek | The current day of week, based on the Time field. |
| DayOfMonth | The current day of the month, a value between 1 and 31, inclusive. |
| DayOfYear | The current day of the year, a value between 1 and 366 (for leap years), inclusive. |
| Month | The current month, based on the Time field. |
| Year | The current year, based on the Time field. |
| Hour | The current hour, based on the Time field, a value between 0 and 23, inclusive. |
| Minute | The current minute, based on the Time field, a value between 0 and 59, inclusive. |
| RegistrationType | Indicates whether the competition is public or private. |
| CompetitionStartTime | The date and time at which the competition started. |
| CompetitionEndTime | The date and time at which the competition will end. |
| StartingCash | The amount of cash available in the portfolio at the beginning of the competition. |
| MarketBaseCommission | The base commission for a market order. |
| MarketShareCommission | The per-share commission for a market order. |
| LimitBaseCommission | The base commission for a limit order. |
| LimitShareCommission | The per-share commission for a limit order. |
| CashInterestRate | The rate at which a portfolio will earn |

TABLE 1-continued

| Field Name | Description |
| --- | --- |
| | interest for cash. |
| MarginInterestRate | The rate at which a portfolio will be charged for margin usage. |
| MarginAllowed | A flag indicating whether or not buying on margin is allowed. |
| MarginFactor | The margin factor indicating how much can be purchased on margin. |
| MarginMinimumPrice | The minimum price for a security to be eligible for purchasing on margin. |
| ShortAllowed | A flag indicating whether or not short selling is allowed. |
| ShortMinimumPrice | The minimum price for a security to be eligible for short selling. |
| OrderVolumeRatio | Order volume may not exceed a percentage of a security's 10-day average volume based on this ratio. |
| DiversificationRatio | Position size may not exceed a percentage of the portfolio value based on this ratio. |
| SecurityPriceMinimum | The minimum price for a security to be eligible for buying. |
| SecurityPriceMaximum | The maximum price for a security to be eligible for buying. |
| StopLossRatio | Portfolios that fall below a value based on this ratio and the starting cash will be disqualified. |
| BuyingPower | The current buying power for the algorithm's portfolio. |
| Equity | The current equity for the portfolio. |
| PositionCount | The total number of positions in the portfolio. |
| LotCount | The total number of lots in the portfolio. |
| OldestLot | An identifier for the oldest active lot in the portfolio. |
| OldestLotToday | An identifier for the oldest active lot for the day in the portfolio. |
| PositionSize | Number of shares held in the portfolio, across all lots, for the current security. |
| MaxPositionSize | The maximum number of shares that can be held in the portfolio based on the security's current price. |
| AverageBuyPrice | Average price for the current security across all lots, for long positions. |
| AverageShortPrice | Average price for the current security across all lots, for short positions. |
| CurrentLot | An identifier representing the current lot, or 'None' if the lot does not exist. |
| BuyPrice | The price at which the lot was last bought or shorted. |
| BuyTime | The time at which the lot was last bought or shorted. |
| SellPrice | The price at which the lot was last sold or covered. |
| SellTime | The time at which the lot was last sold or covered. |
| OrderSize | The order size for the current order. |
| PositionSize | The position size for the lot. Zero if no position is currently held. |
| OpenDuration | The amount of time the lot has held a position, equivalent to Time – BuyTime. |
| CloseDuration | The amount of time the lot has had a position size of zero, equivalent to Time – SellTime. |
| 10DayAverageVolume | The 10-day average volume for the security. |
| 3MonthAverageVolume | The 3-month average volume for the security. |
| 50DayAverage | The 50-day average for the security. |
| 200DayAverage | The 200-day average for the security. |
| 52WeekHigh | The 52-week high for the security. |
| 52WeekLow | The 52-week low for the security. |
| 26WeekHigh | The 26-week high for the security. |
| 26WeekLow | The 26-week low for the security. |
| 13WeekHigh | The 13-week high for the security. |
| 13WeekLow | The 13-week low for the security. |
| MonthHigh | The 1-month high for the security. |
| MonthLow | The 1-month low for the security. |
| DayHigh | The 1-day high for the security. |
| DayLow | The 1-day low for the security. |
| DayVolume | The 1-day volume for the security. |
| DayProjectedVolume | An estimation of the 1-day volume for the security based on activity to date. |
| Beta | The beta for the security. |
| MaxOrderSize | The maximum order size allowed for the security based on its current price, the portfolio state, and the order limit rules enforced by the simulator. |
| Float | The float value for the security. |
| MarketCap | The market cap for the security. |
| PE | The Price/Earnings ratio for the security. |
| Symbol | The symbol for the security. |
| EPS | The earnings per share for the security. |
| DPS | The dividends per share for the security. |
| DividendYield | The dividend yield for the security. |
| StartTime | The start time for the interval. |
| EndTime | The end time for the interval. |
| Sequence | The interval sequence for the current interval. |
| Open | The open price for the interval. |
| Close | The close price for the interval. |
| Volume | The volume for the interval. |
| OpenTime | The time within the interval at which the open price was captured. |
| CloseTime | The time within the interval at which the close price was captured. |
| High | The high price for the interval. |
| Low | The low price for the interval. |
| UpTicks | The number of up ticks in the interval, where an up tick is defined as a trade occurring at a higher price than the last trade. |
| DownTicks | The number of down ticks in the interval, where a down tick is defined as a trade occurring at a lower price than the last trade. |
| Ticks | The total number of ticks (trades) in the interval. |
| RSI | The Relative Strength Index for the interval. |
| ATR | The Average True Range for the interval. |
| MACD | The Moving Average Convergence/Divergence for the interval. |
| MACDSignal | The Moving Average Convergence/Divergence Signal for the interval. |
| MACDDiff | The Moving Average Convergence/Divergence Difference/Histogram for the interval. |

One example of a statistic that can be used within an algorithm is Relative Strength Index ("RSI") which is calculated by dividing a security's AverageGain over some number n (e.g., 14) previous intervals by the AverageLoss over the number of previous intervals. RSI depends on the closing price of the previous n+1 intervals (in this case, 15, as RSI will have no value until the 15$^{th}$ interval). For example, calculating a 1-minute RSI requires the 15 previous 1-minute intervals, calculating a 15-minute RSI requires the previous 15 15-minute intervals, etc. For low volume securities the previous 15 intervals can span a longer period than the previous 15 minutes. For example, if a security is not traded during a 1-minute interval, the previous 16 intervals may be needed to get 15 1-minute intervals. The pseudo-code below provides one example of computing the RSI:

```
If (Close[N] – Close[N-1] >= 0) Then
    CurrentGain[N] = Close[N] – Close[N-1]
    CutrentLoss[N] = 0
```

-continued

```
Else
    CurrentGain[N] = 0
    CurrentLoss[N] = Close[N-1] - Close[N]
End
```

$$AverageGain[15] = \left(\sum_{i=1\ldots14} CurrentGain_i\right)\Big/14$$

$$AverageLoss[15] = \left(\sum_{i=1\ldots14} CurrentLoss_i\right)\Big/14$$

```
AverageGain[N] = ((AverageGain[N-1]) * 13 + CurrentGain[N]) / 14
AverageLoss[N] = ((AverageLoss[N-1]) * 13 + CurrentLoss[N]) / 14
For N < 15,
    RSI_N = 50
Else for N >= 15
    If AverageLoss_N == 0)
        RSI_N = 100
    Else
        RS_N = AverageGain_N / AverageLoss_N
        RSI_N = 100 - 100 / (1 + RS_N)
    End
End
```

Other statistics include an Average True Range (ATR), a Moving Average Convergence/Divergence (MACD), a Moving Average Convergence/Divergence Signal (MACDSignal) and a Moving Average Convergence/Divergence Difference/Histogram (MACDDiff). The pseudo-code below provides one example of computing the ATR:

$$ATR_{14} = \left(\sum_{i=1\ldots14} TrueRange_i\right)\Big/14$$

For N>14:

$$ATR_N = (ATR_{N-1}*13 + TR_N)/14$$

where the TrueRange is calculated as:

```
High[N] - Low[N]
Abs(High[N] - Close[N-1])
Abs(Low[N] - Close[N-1])
```

The Moving Average Convergence/Divergence (MACD) for a security is calculated as a difference between its 26-interval and 12-interval exponential moving average, and is based on an exponential moving average ("EMA"), which can be calculated as:

```
EMA_N = ((Close_N - EMA_N-1) × Multiplier) + EMA_N-1
Multiplier = 2 / (Bars + 1)
Multiplier_26 = 2 / (26 + 1) = .0741
Multiplier_12 = 2 / (12 + 1) = .153
Multiplier_9 = 2 / (9 + 1) = .200
```

The exponential moving average can be used once there are sufficient data points, however initially a Simple Moving Average ("SMA") is used, according to the following pseudo-code for the 12-bar EMA and the 26-bar EMA, respectively:

12-Interval EMA

On the 12th interval, 12-interval EMA=12-interval SMA=

$$\left(\sum_{i=1\ldots12} Close_i\right)\Big/12$$

and subsequent values of 12-interval EMA can be calculated using:

[12-bar EMA]N=((CloseN–[12-bar EMA]N–1)×
    0.153)+[12-interval EMA]N–1

26-Interval EMA

On the 26th interval, 26-interval EMA=26-interval SMA=

$$\left(\sum_{i=1\ldots26} Close_i\right)\Big/26$$

and subsequent values of 26-interval EMA can be calculated using:

[26-interval EMA]N=((CloseN–[26-interval EMA]N–
    1)×0.0741)+[26-interval EMA]N–1.

At which point the MACD, MACDsignal and MACDdiff can be calculated using the following pseudo-code:

```
For N < 26: MACD_N = 0
For N >= 26: MACDN = [12-interval EMA]N - [26-interval EMA]N
For N < 26: MACDSignal_N = 0
For N >= 26: MACDSignal_N = ((MACDN - MACDSignalN-1) ×
    0.200) + MACDSignal_N-1
For N < 26: MACDDiff_N = 0
For N >= 26: MACDDiffN = MACDN - MACDSignal_N
```

In some embodiments, individual trading strategies and/or algorithms can be either shared throughout the domain or kept private. In some cases, the DSL facilitates the definition of macros that can be used to implement common functionality. For example, a trader may define a macro that sells all open positions if certain market conditions occur. Due to the general nature of such a macro, the trader may decide to publish the macro (along with any parameters necessary for its operation) to the investment domain for use by other traders and/or portfolio managers.

In certain circumstances, a user (e.g., a trader, portfolio manager, or individual investor) may copy the strategy and use it as a template for a new strategy or algorithm. A trader may also decide to submit the algorithm to the domain administrator, and in some cases the domain may offer compensation such as a license fee for such a submission. An algorithm may be classified as "read-only" in certain cases, such as if it has participated in a competition, is currently running, or designated as such by the trader who built the algorithm. In some instances, a user may wish to halt an algorithm to modify the algorithm during a contest to make changes to the algorithm to fix a mistake, alter the strategy, etc.

In some embodiments, the domain administrator manages an algorithm library. The algorithm library may be used, for example, to store algorithms determined to be winning algorithms (or in some cases all algorithms) based on their performance during an algorithm competition, their performance during some period of time, in response to market data, or some combination of thereof. The administrator may provide access to the algorithm library for a fee, such as a subscription fee or license for example, and allow other traders, or external entities access to either the algorithms themselves, trading instructions generated by the algorithms, or both. The library can include various parameters, investment strategies, performance metrics and/or ratings of the algorithms to allow subscribers information regarding particular algorithms, and may be advertised as a market for buying, selling, trading and licensing algorithms. In certain implementations, the library includes a database for storing information such as described above, as well as an "electronic store-front" through which interested parties may review (and in some cases pay for and receive) performance metrics, competition results, and investment strategies corresponding to the algorithms.

In some embodiments, the domain administrator provides private-label competitions and/or sponsorship opportunities for companies interested in identifying exceptional traders and/or algorithms such that the sponsor will have exclusive access to the results of the competitions, for example by subscribing to the algorithm library (or a portion thereof) and/or paying a fee for access to the traders themselves. In some cases, the results of the private-label competitions are stored in the common library and are made available to other parties, whereas in other cases the results remain proprietary to the sponsor.

The DSL parser (448 of FIG. 4) parses the DSL (either during development or upon submission) and performs type checking, identifies keywords, operators (algebraic, relational and logical), checks for use of constants, and determines if the script adheres to the DSL language structure and other rules.

In one embodiment, the investment information domain includes one or more portfolio managers, who may be, or may be working on behalf of a registered investment advisor, having fulfilled the requisite requirements as set forth in various governmental and market rules and regulations. The portfolio managers may, in some cases, be engaged as contractual employees of the domain administrator thus allowing the domain administrator to provide oversight and supervision of the portfolio managers. The portfolio managers may be full-time employees, part time employees, contractors, consultants, or some combination thereof, depending on many factors, including, for example, the relevant regulations governing such activities. The universe of traders from which the portfolio managers can be selected during a qualification event can include seasoned investment professionals, students, teams—essentially any individual or group that, during one or more events, demonstrates that their investment strategy(s) outperform a majority of the other traders' investment approaches.

In some cases, portfolio managers may be selected from the general public, and provided access to the research data and algorithms maintained by the investment information domain, and manage funds (e.g., a mutual fund) on behalf of investors based on such information. For example, a portfolio manager can base the holdings and trading strategy of a mutual fund on one or more algorithms submitted to the investment information domain. In some cases, a fund may be based on a single algorithm, whereas in other cases (e.g., where individual algorithms are focused on a narrow market segment) multiple algorithms can be combined into an integrated strategy.

Figure 6:
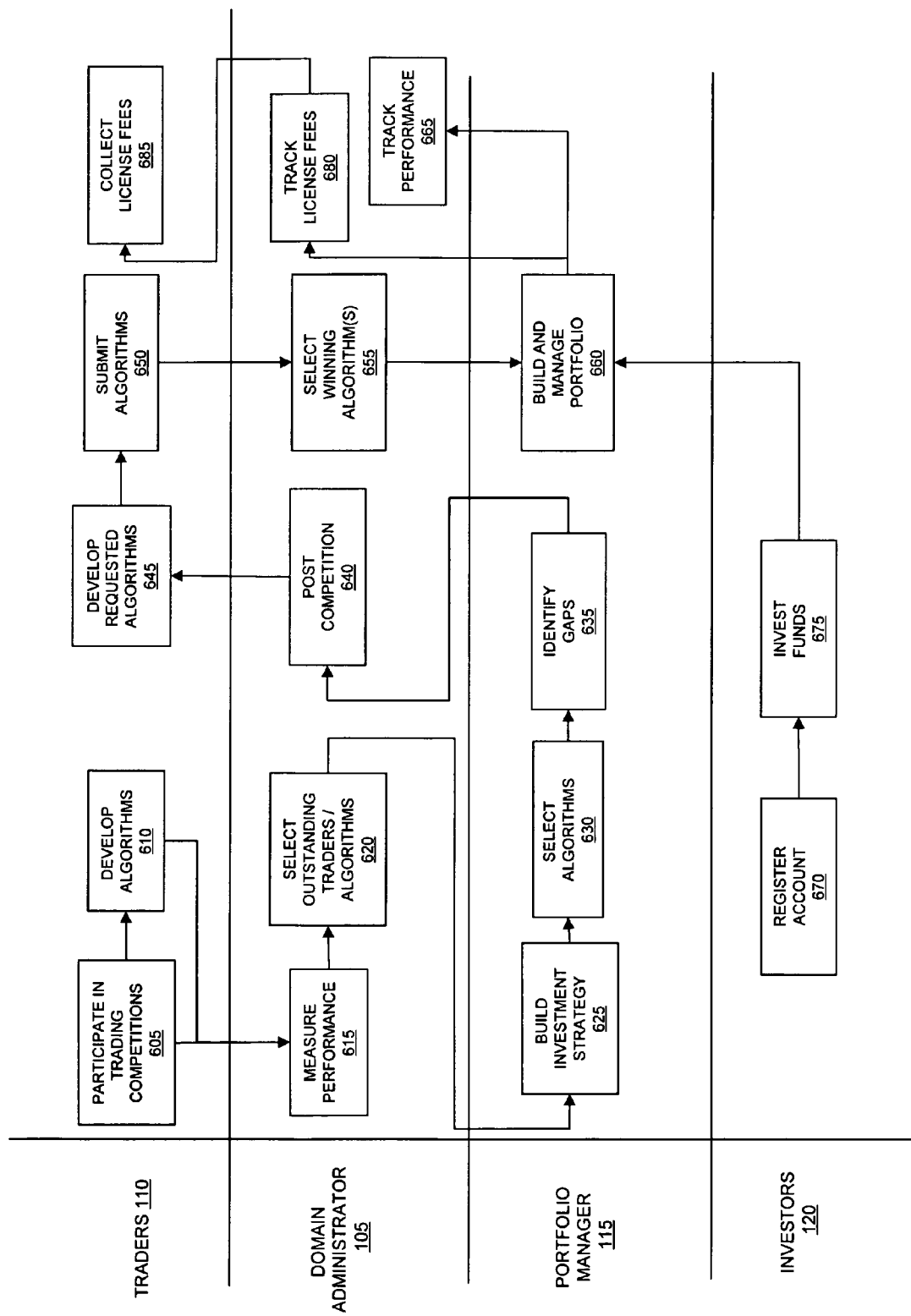
FIG. 6 is a more detailed flow chart depicting the steps for identifying exceptional traders and offering investment opportunities based on the traders' strategies in accordance with one embodiment of the invention.
Figure 7:
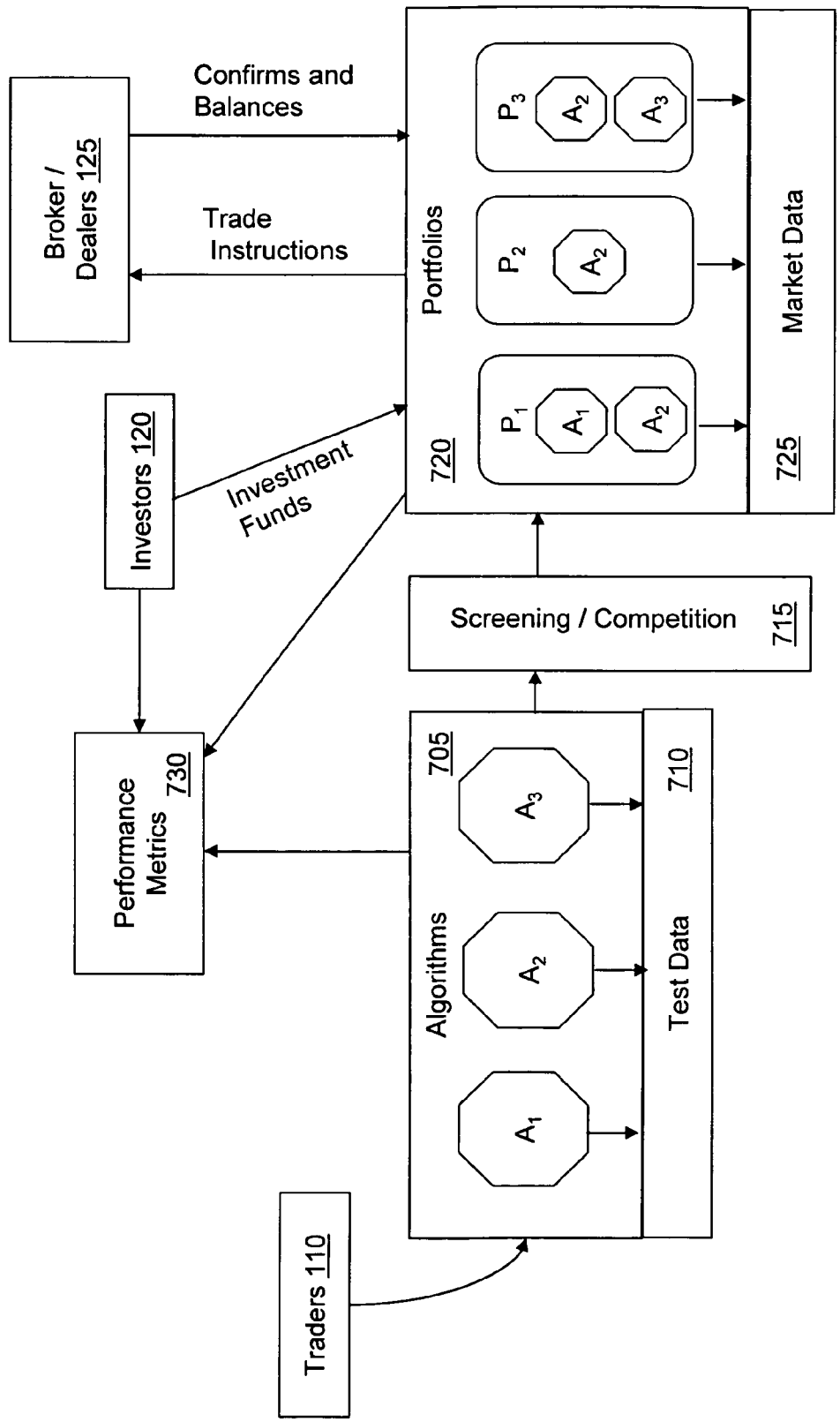
FIG. 7 is a block diagram illustrating interactions among various entities within the investment information domain according to various embodiments of the invention.

Referring to FIGS. 6 and 7, a method for providing investment opportunities to investors 120 based on the investment strategies designed and developed using the domain is shown. Traders 110 participate in trading competitions (STEP 605), for example, as described above, and in some cases develop (STEP 610) algorithms 705 during such competitions using, for example, the DSL, or other programmatic technique.

In some embodiments, the traders 100 (or in some cases the domain administrator 105 and/or portfolio managers 115) can test the algorithms using historical data (stored, for example, it the database server descried above). The selection of historical data can be done in numerous ways. For example, a trader may identify a particular time period or periods (e.g., 1987, and Q3 and Q4 of 2000) against which their algorithm should be tested. In other embodiments, a trader can indicated one or more overriding market conditions (e.g., high inflation, election year, low interest rates, and high unemployment) and search the historical data for periods that meet such conditions. Furthermore, a trader may determine that a particular set of market conditions represent the preferred testing environment for the algorithm, except for one (or some other typically small number) of conditions. In such cases, the trader can indicate the particular market conditions that should be altered (and in some cases provide an explanation as to why) and test his algorithms under the resulting "artificial" conditions. In some cases, the trader may wish to test his algorithm against multiple market conditions, in which case the performance module can calculate the performance of the algorithm against varying market conditions.

In some embodiments, the traders submit algorithms to the domain along with the suggested test data against which the algorithm is to be run. In other embodiments, the portfolio manager 115 or the domain administrator 105 select the test data after submission, thereby requiring that the algorithms perform well under unknown, and potentially a variety of circumstances. In certain embodiments, traders may identify particular market conditions or time periods that should be used as test data for algorithms developed by other traders. Such a feature provides a mechanism for traders to "challenge" the performance and/or effectiveness other traders' algorithms under various conditions. In some cases, the results of the challenges can be used to improve the score attributed to the algorithm(s) submitted by the challenging trader and/or lower the score of the challenged algorithm. Competitions may also be run using live market data over a predetermined period (e.g., a day, week, month, quarter, or a period determined by the administrator, traders, and/or portfolio managers). The live data may be received from an external source (e.g., LiveWire, Reuters, etc.) via a electronic data feed, for example.

During and/or at the end of the competition 715, the domain administrator 105 measures the performance (STEP 615) of the traders 100, algorithms 705, or both. Based on the performance (as well as other parameters such as investment strategy, experience, ratings, and others) the domain administrator 105 selects the exceptional traders 110 (STEP 620) and/or algorithms 705 and provides opportunities to manage a portfolio on behalf of investors 120.

Once selected as an outstanding trader and upon agreement to codes of conduct and/or regulations, the trader takes on the role of a portfolio manager 115. The portfolio manager 115 compiles a portfolio 720 of investments an investment strategy (STEP 625) based, for example, by selecting algorithms 705 (STEP 630) previously developed, by designing new algorithms 705, and/or selecting algorithms submitted by other traders 110. An algorithm 705 can, in some cases, be shared among any number of portfolios 720, and portfolios 720 can employ one or more than one algorithm to effectuate the overall trading strategy of the portfolio manager 115. Other algorithms may be designated as proprietary, and their use limited to one (or a specified group of) portfolio(s), where, for example, an entity contracts with the domain administrator to have an algorithm developed based on a particular strategy that they do not want to become public. As one possible example, three algorithms $A_1$, $A_2$ and $A_3$ are can be used across three different portfolios, $P_1$, $P_2$ and $P_3$ such that algorithms $A_1$ and $A_2$ are used by portfolio $P_1$, algorithm $A_2$ is used by portfolio $P_2$, and algorithms $A_2$ and $A_3$ are used by portfolio $P_3$. Once employed as part of a portfolio strategy, the algorithms monitor market data 725 to determine the resulting trade instructions, which are then forwarded to a broker/dealer 125 for processing. At all times, performance metrics 730 are calculated and gathered for traders 110, algorithms 705, and portfolios 720, such that the traders 110, investors 120 and portfolio managers can review and compare performance metrics.

In some cases, the portfolio manager 115 may identify a gap (STEP 635) between her desired set of algorithms and those that are available from the traders 110 and the domain administrator 105, and create, organize or request the domain administrator to initiate a custom competition to solicit traders and/or algorithms that meet a particular need. In one embodiment, for example, if no algorithm exists meeting the particular strategy of the portfolio manager, or if those that exist do not provide the desired performance, the portfolio manager 115 can request that the domain administrator 105 post (STEP 640) a request (e.g., within the investment information domain) for the development of such an algorithm. In such cases, the traders 110 may compete against each other (and other algorithms) to develop (STEP 645) and provide the new algorithm. For example, the portfolio manager 115 can post certain parameters within which the algorithm is to operate (e.g., maximum positions, limited short sells, stop losses, excluded equities, specific geographical regions, etc.) and the traders 110 then use the tools and data available within the investment information domain to develop such algorithms. In some embodiments, only pre-existing algorithms participate in the contest (in some cases without the knowledge of the trader(s) that developed the algorithm) and the winning algorithm can be selected based on quantitative measures (e.g., market performance), qualitative measures (e.g., quality of documentation, degree of compliance with DSL constructs, etc.) or some combination thereof.

For example, a portfolio manager 115 may desire an algorithm that issues buy and sell orders for a set of equities under particular market conditions. The domain administrator 105 can then post a problem statement describing the parameters of the desired algorithm and some or all of the conditions under which the algorithm is to perform. In response, one, two (or any number of) traders utilize the DSL to develop algorithms that include any number of different strategies, that, when considered together, represent the traders' solution to the problem. One trader, for example, may determine that the price variations in futures contracts based on the particular equities of interest have a high correlation to the price fluctuations of the underlying equity, and therefore base his algorithm on options prices. Another trader may determine that when the slope of the 200-day moving average of a particular index (e.g., the Russell 2000) achieves a particular positive value, the particular equities should be sold. The traders can utilize the domain to test their algorithms against various datasets containing historical data as well as artificially created data based on various market conditions. Once satisfied that their algorithms are complete, the traders submit the algorithms (STEP 650) for review and testing by the domain administrator 105 and/or portfolio manager 115.

Based on actual and/or historical performance, the domain administrator 105 (or in some cases the portfolio manager 115, or even both) select (STEP 655) one (or a set of) the algorithms as the winning algorithm to be included in the investment strategy. When an algorithm is selected, it can then be incorporated (STEP 660) into the trading strategy of the portfolio manager 115 and used to suggest or execute the ongoing trading in the portfolio. In some cases, the selected algorithm is made available to other portfolio managers 115 and/or traders 110, whereas in other cases the algorithm remains confidential. The trader that submitted the winning algorithm (or in some cases multiple traders that submitted the top three algorithms, for example) can then be awarded a one-time payment for winning the competition. The award may have been communicated to the traders prior to, during or after the competition, and can also be based on the combined needs of multiple portfolio managers that, collectively, need similar algorithms.

In some competitions, traders 110 may be provided a predefined set of algorithms, from which they can select (and in some case modify) to build their trading strategy. For example, the domain administrator 105 may determine that a set of ten algorithms provides sufficient variability among potential traders' strategies and publish the algorithms as part of a trading simulation contest. In some cases, the starter set of algorithms can be based on known portfolio theories, whereas in other instances the set may be selected at random. The traders 110 can then select one or more algorithms from the set, alter any parameters, and initiate a simulation. In this manner, traders 110 that are unable or unwilling to build their own algorithms can still be encouraged to participate and become rated. Thus, through the use of the DSL and macros, traders 110 that do not possess certain mathematical knowledge or programming skills may build algorithms and participate in the domain without having to write software code.

In other competitions, the set may include algorithms that are incomplete, perform well under limited circumstances, perform poorly, and/or are non-functional. In such cases, the traders 110 provide the modifications and additional information such that the algorithms function properly and produce excellent (or better) returns.

For example, a portfolio manager 115 may determine, based on intrinsic metrics, algorithms employed, recent news, or other factors, that an investment in one security (e.g., Google "GOOG") is warranted. The portfolio manager communicates a trade order using, for example, client software and/or a web-browser to the server, which forwards the trade to the broker/dealer who, in response to the trade request, executes the trade according to the specific instructions of the trade. Using the example of purchasing Google stock above, the portfolio manager may determine that the purchase is only warranted at a particular price. Thus, the portfolio manager would issue a limit order, indicating particular price at which the purchase is authorized. If, for example, the broker can fill the order at that price or better, the trade is executed. In cases in which the portfolio manager uses one or more algorithms to determine trades, the outputs of the algorithms (generally trade instructions) can be routed directly or indirectly to the broker for execution. In some case, the routing occurs automatically without the portfolio manager's review, whereas in other cases trades can be presented to the portfolio manager prior to execution for approval and/or modifications.

In certain embodiments, the portfolio manager's role includes selecting one or more algorithms to be included in the overall portfolio strategy to achieve exceptional returns.

For example, in a case where a first trader developed an algorithm for trading technology stocks, a second trader developed an algorithm for trading bonds, and a third trader developed an algorithm for trading foreign exchange contracts, the three algorithms can be combined into an overall trading strategy. By providing such functionality, the portfolio manager can take advantage of specialized algorithms developed by traders with specific subject area expertise, but do so in a programmatic, predictable manner.

In some examples, full service brokers are used to route and fill trades, whereas in some cases fully electronic trade routing firms such as Instinet™ or Archpelago™ can be used instead of or in conjunction with the full service brokers to route and execute trades, perhaps using electronic data exchange features such as application programming interfaces and XML/SOAP/Web Services as examples. Other order types such as market orders, at close orders, day orders (also referred to as good 'till close orders), block orders, basket orders, immediate or cancel orders, below market orders, and stop-loss orders are but a few of the possible orders that may be used by the portfolio managers to achieve a desired portfolio mix and maximize returns.

In some cases, the portfolio managers can trade on margin. Margin trading is used, where allowed, to buy or short positions in an investment account using borrowed money. For example, a portfolio manager may be allowed to trade at a 2:1 margin—meaning that he can borrow up to 50% of the value of his account to buy additional positions. This allows portfolio managers to leverage existing positions and potentially achieve greater returns, albeit at a greater risk if the stocks purchased on margin decline in value. In some embodiments, minimum maintenance account levels are established to limit a portfolio manager's downside risk. As an example, the federal minimum maintenance margin is 25%, thus if the total value of an account (cash+equities) falls below 25% of the amount borrowed to purchase the equities on margin, positions are sold until the margin level reaches 25%. In some instances, brokers may have higher minimums than the federally mandated minimum of 25%.

In some embodiments, the domain administrator provides oversight and compliance functions with respect to the trading activities of the traders and/or portfolio managers. For example, where a portfolio manager has indicated that a certain investment strategy is based on small-cap equities of consumer goods manufacturers, the oversight function may include monitoring the trading activity of the portfolio manager to confirm that the equities purchased by the portfolio manager do in fact match the portfolio manager's stated objectives. As another example, oversight can include assuring that the asset allocation within the portfolios meet certain guidelines or rules relating to percent allocated to any one equity and other similar limits on portfolio holdings.

Compliance functions may include monitoring all trades made by or on behalf of a portfolio manager (either exclusively through the domain administrator, using external trading services, or a combination of both) to confirm that no illegal or questionable trade activity is taking place. For example, if a portfolio manager knows that their strategy will generate a large buy order for a particular equity, and prior to executing that large purchase initiated a purchase of the same equity in a different account, this would be considered "front-running" the large buy. Such trading practices typically are considered improper, and in some cases may be illegal. Likewise, if a trader knows that the algorithms they developed are in use by particular portfolio managers, they may know that certain trades will be executed, and front-run the trades initiated by the algorithm. By overseeing all the trading activities of the portfolio managers and traders, and taking other measures, such as having portfolio managers warrant and/or provide documentation to demonstrate that they will not participate in such activities, the domain administrator can implement compliance procedures. The compliance and oversight activities and systems to support such services, may also, in some instances, be outsourced to another party.

Still referring to FIG. 6, as a trader or portfolio manager 115 builds a history managing funds allotted to her, various statistical metrics are calculated to measure her performance (STEP 665). In some embodiments, the same metrics used to identify the best traders and algorithms during the qualification phase are used to identify, rank, and report on the performance of the portfolio managers. These metrics, and, in some cases, descriptions of the strategies used to generate the returns are posted on, for example, a web page which is made available over the Internet. Other methods such as email, facsimile, RSS feeds, instant messages, and voicemail can also be used to distribute the performance metrics.

In some embodiments, the top traders and/or portfolio managers are compensated for achieving superior investment returns. Compensation may be in any suitable form, for instance, monetary compensation, vacations, tangible objects, intangible objects, increased ratings within the investment information domain, or any combination thereof. In some cases, trader and/or portfolio manager compensation can also be allocated to traders who submitted algorithms used by the trader and/or portfolio manager to achieve her results, as described in more detail below.

In conjunction with identifying top portfolio managers and facilitating their professional management of investment funds, the investment information domain attracts investors 120 looking for opportunities and ideas that will help them achieve superior investment returns. In some cases, the individual investors must meet specific requirements such as net worth, assets available for investment, liquidity, and the like. For example, a particular investment opportunity (e.g., a hedge fund) may require the investors to be "qualified purchasers" with total investments of at least $5 million. Other investment opportunities may require a net worth of $1.5 million, or in some cases no minimum. Investors can also be groups of individuals, such as an investment club, husband and wife, a pension fund, etc.

To take advantage of the investment information posted by, in, or on the domain, investors 120 can establish (or have already established) personal investment accounts and may use the accounts to invest in individual traders, groups of traders, algorithms, and any combination thereof. In some embodiments, the accounts are set up using the systems and functions of the investment information domain. For example, the domain administrator may partner with one or more brokerage firms (e.g., E*TRADE™, SCHWAB™, FIDELITY INVESTMENTS™, etc.) and in return for providing customer leads, receive a commission or other compensation (e.g., reduced or waived trading fees) for referring individuals. In other examples, the investors 120 may already have established one or more brokerage accounts, and utilize the services of the domain to effectuate suggested investment decisions through those accounts. In some cases, the investors may have previously established accounts with a registered brokerage firm, or similar financial institution that acts as a custodian for the investor's money and provides any necessary accounting and tax reporting functions to manage the accounts. In such instances, the investor 120 provides sufficient information to the investment information domain to facilitate identification of and interface with such accounts.

Investors 120 may provide membership information to the investment information domain (STEP 670) in a similar fashion to methods and data described above with respect to the traders 110. Investors 120 provide, for example, an email address and/or an instant messaging address, an alias or "handle" by which they are identified within the domain, and a password, as well as account information, investment objectives, investment styles, areas of interest, specific investments to avoid, as well as demographic information (age, gender, location, etc.). In some instances, the membership information is transmitted from the investment information domain to the brokerage firm and/or custodian being used to establish the investor's account, and may be used to qualify or disqualify the investor from participating in the domain. For example, certain brokerage firms may have minimum account balances, or may require a minimum credit rating to establish an account.

Once an investor 120 has completed the enrollment process and set up the appropriate accounts, she can allocate the assets in her account(s) among various portfolios 720 (STEP 675). Typically, the allocation decisions are based on the historical performance data 730 posted on one or more Internet pages maintained by the domain. However, investors 120 are free to select the portfolios 720 based on any factors that they wish, including, for example, an investment strategy based on one or more quantitative algorithms designed by the portfolio manager, the historical performance of the portfolio manager, as well as others. As one example, one or more funds (e.g., mutual funds, hedge funds, etc.) can be established by the domain administrator, and a portfolio manager (or team of managers) assigned to run the funds.

In some embodiments, allocated funds are simply deposited into an account and managed by the portfolio manager, but in other embodiments no actual transfer of funds takes place. In such an arrangement, the investor's funds are merely "allocated to" a portfolio manager in the sense that trades made by that portfolio manager are replicated in the investor's account. As an example, an investor may allocate 100% of an account holding $10,000 to a single portfolio manager. Subsequently, the investment strategy employed by that portfolio manager managing an account worth $100,000 indicates that a favorable market condition exists to purchase 100 shares of IBM at the current market price of $75 per share. If such a trade were to be executed in the investor's account, however, IBM would represent 75% ((100*$75)/($10,000)) of their total account. Therefore, in some instances the purchase is adjusted based, for example, on the proportional size of the investor's account balance and the portfolio manager's account. In the example provided above, the 100 share purchase would be adjusted by 10% ($10,000/$100,000), resulting in a purchase of 10 shares of IBM for a total investment of $750.

In another example, a portfolio manager may determine that her ideal portfolio should allocate 3% of its assets to a particular equity. If an investor has associated his account with this portfolio manager, but already owns shares of that particular entity (because, for example, a portion of their account is allocated to another portfolio manager that has already suggested that equity), the buy order may be reduced, or even not executed at all, if the investor's account already contains a sufficient number of shares to meet the 3% desired position. In some cases where an individual is too heavily weighted in a particular entity, a buy order coming from the portfolio manager is changed from a buy order to a sell order, such that the number of shares in the investor's account is in line with the portfolio manager's strategy.

In some embodiments, the number of investors and/or the amount of funds that can be allocated to a particular portfolio manager may be limited. Such limits include, by way of example, a minimum number of investors, a maximum number of investors, a minimum amount of money, a maximum amount of money, or some combination thereof. For example, a certain investment strategy may achieve its optimal performance when its total pool of assets remains below $1,000,000, and therefore certain portfolio managers may become "fully subscribed" and closed to new investors.

The investment information domain also provides investors with the ability to define and implement investment rules that, in some cases, can override instructions from one or more portfolio managers. For example, as described above, an investor can identify three portfolio managers and allocate the money in their account equally (or unequally) among the three. However, if that investor does not wish to buy stock from a particular company because, for example, they are an insider, or they have philosophical objections to the business dealings of the company, they may block any purchases of that stock. Other rules such as stop-losses (expressed in either amounts or percentages), maximum gains can also be entered to affect subsequent trades. In one embodiment, the allocation module has capability to allow investors to set such rules during enrollment, and to allow maintenance and updating of the rules at any time thereafter.

Investors may have multiple accounts with the investment information domain, and may allow the trades suggested by the portfolio managers to execute across all of, or a subset of these accounts. They also can exercise control over how the trades are divided and executed. For example, an investor that has two accounts may desire to have each account use a different investment strategy, i.e. a retirement account that uses a somewhat aggressive investing style, and a college savings account that uses a more conservative style. Thus, specific rules may be set up for each account. However, in some cases, investors may wish to have the investment domain treat their collection of accounts as one large account—effectively creating a virtual pooling of the accounts, and therefore allowing one or more trades to be split across multiple accounts. As an example, where an investor has associated four accounts with a different portfolio managers, and one of the managers is recommending a purchase of 100 shares of Microsoft at $25.00, the purchase may be allocated across the four accounts such that 25 shares are purchased for each account. The system can be configured such that the weighting can be equal, or such that certain accounts may receive a larger or smaller share of the trade depending on the investor's preferences. Other investors may use different accounts for different purposes or different securities, such as one account holding fixed-income securities in a tax-free account, and equities that, for example, are held for the longer term in a taxable account.

In addition to providing detailed descriptions of the investment strategies employed by the portfolio managers and various historical performance data, the investment information domain also facilitates communication among the portfolio managers and the investors. Communication can include electronic mail, instant messaging, web log postings, voicemail, and other forms of electronic communications. In one embodiment, communications between the portfolio managers and the investors takes place within a secure environment such that the communications can be monitored and retained in a historical database to, for example, comply with necessary oversight and compliance rules.

In cases where multiple algorithms are employed, it may be possible to allocate portions of a portfolio to each algorithm.

One approach for managing potential conflicts among the algorithms is to look at the algorithms in general. As examples of the general algorithm approach, one algorithm may indicate that a certain equity should be sold at a certain price in a certain market condition, while another algorithm may indicate it should be sold at a different price, or even purchased. One technique uses the ratings of the algorithms to create an "algorithm hierarchy" such that conflicts are resolved in favor of the algorithm having the highest ranking. Another algorithm-level method considers the length of time an algorithm has maintained some minimum performance. In some cases, the strategies may not directly conflict, such that a compromise position can be determined, such as averaging two buy orders having different order sizes. Other techniques include considering recent performance, the ratings of the trader that developed the algorithm, manual selection by the portfolio manager, and any combination of the foregoing.

Each (or all) of these techniques can also be implemented using the scripting language described above, in a sense creating an "algorithm of algorithms." For example, each algorithm can be identified by a moniker such as an algorithm name or ID, and instantiated within an algorithm "harness" that, using the DSL for example, can be triggered based on one or more indicators. Thus, a trader may implement a trading algorithm by combining various algorithms created by various, otherwise unaffiliated developers. As a result, a portfolio manager employing the use of a suite of algorithms, some of which may operate completely independently of each other (e.g., a domestic equity-bases strategy and a foreign exchange trading strategy), and some over lap (e.g., a small-cap strategy and a technology-focused strategy) can implement each algorithm across a shared pool of funds and programmatically manage the simultaneous execution of each underlying strategy within the algorithms. As one non-limiting example, a portfolio manager may determine that a when the slope of a 200-day moving average over a ten day period is above 2%, the amount her portfolio's funds should be weighted towards a small-cap equity algorithm, whereas when the same slope drops below 0% (i.e. a flat market) the funds should be reallocated to a more conservative algorithm.

Conflicts may also be resolved at the trade strategy level by providing data regarding the specific strategy to the portfolio manager for manual selection, basing the selection on a total dollar amount (e.g., always select the strategy having the lowest dollar amount), trade instruction (e.g., buy versus sell), order size (execute the highest order size), as well as other strategy-specific parameters.

In some cases where individual traders (and/or their algorithms) are highly rated, an advance can be paid to commission the development of new algorithms. For example, a portfolio manager may determine that her portfolio could benefit from an algorithm that tracks foreign exchange rates and buys and sells foreign equities based on such data. In some instances where the algorithm was developed by a team of traders, the revenue generated by the algorithm can be shared, based, for example, on individual contributions to the algorithm and/or other arrangements among the traders. The domain administrator tracks the license fees due (STEP 680) which are then collected (STEP 685) by the individual traders, as described below.

In embodiments in which the traders develop and submit trading algorithms for competition (or in response to a request posted by the domain administrator, a portfolio manager, or a third party), the compensation module 446 determines which traders receive compensation (points, money, access to potential employers, etc.) based on the use of their algorithms. In some embodiments, prizes can be awarded to multiple traders, such as awarding a prize for the winner, another prize for second place, and so on, as to encourage participation among a community of traders. For example, if a trader submitted an algorithm that subscribes to a particular investment theory and is known to perform well under certain circumstances, one or more portfolio managers may wish to include the algorithm as part of their overall trading and portfolio management strategy. Furthermore, the need for such an algorithm may be such that the portfolio manager is willing to pay for it, and thus may offer a trader payment (e.g., an up-front payment, a commission based on the performance of the algorithm, or a combination of the two) for a completed, operational algorithm that meets certain specifications. In some embodiments, the compensation paid can be based on management fees collected (e.g., ½ of a basis point), overall performance, a licensing fee (either one-time or recurring) or a fixed fee. In some cases, a trader may be paid a retainer to continually develop and modify algorithms for a portfolio manger or managers. In cases where an algorithm is used by multiple portfolio managers, a royalty pool can be established, and individual payments made from the pool to the trader or traders that developed the algorithm.

In embodiments in which multiple traders contribute to an algorithm (or a group of algorithms) the compensation module 446 may track the total revenue, individual traders' contribution to the algorithm (if a team in fact developed the algorithm), each trader's royalty percentage, the total royalty, and individual royalties for each trader. The contribution can be a predetermined amount of effort that is specified in advance of the development of the algorithm. For example, the contribution of each trader is determined by the amount of time, level of skill (determined by previous ratings, contest rating, experience or a combination), or degree of effort put forth by each trader. The expected proportional contribution of a trader is the development trader's royalty percentage. In one embodiment, the trader's royalty percentage is determined by dividing the total work contribution that is expected to be required by the trader to accomplish her task by the total work contribution that is expected to be required by all of the traders to develop the algorithm. In the event that errors or omissions are found or the algorithm is somehow changed, upgraded or otherwise modified, an adjustment may be made to the trader's royalty percentage for that modified version, to reflect the new contribution division.

In one embodiment, a royalty pool percentage is selected for an algorithm. The royalty pool percentage may be a percentage of total revenues (e.g., management fees) collected by portfolio managers that use the algorithm and reserved for royalty payments to the trader or traders who developed the algorithm. In one embodiment, the anticipated royalty pool percentage for an algorithm is included in the specification provided by the portfolio manager requesting development of the algorithm. In some embodiments, the royalty pool percentage may depend on other business factors, such as time or popularity of an algorithm. There may be a subscription fee or other price attributed to the algorithm, or for gaining access to a library of algorithms and/or the trading instructions generated therefrom. In one embodiment, the royalty pool is determined by multiplying the royalty pool percentage by the total revenues received for use of the algorithm during a predetermined time period.

FIG. 8 illustrates, in tabular form, one example of a revenue/licensing model in which traders are compensated for the use of their algorithms in accordance with various embodiments of the invention. Algorithms 805 can be associated with one or more traders 810 based, for example, on the amount of participation or effort each trader contributed to the development and/or testing of the algorithm. For example, algorithm A1 is associated with traders T1 and T2, with a contribution percentage of 60% and 40%, respectively. Based on various parameters of the algorithm (e.g., performance, market segment, etc.) portfolio managers can then incorporate the algorithm into an overall investment strategy for their portfolios 815. As an example, portfolios P1, P2 and P3 each employ algorithm A1 in their overall strategy.

Algorithms can have different fee structures 820, depending, for example, on an election by the trader that developed the algorithm, the portfolio manager who wishes to use the algorithm, negotiations between the trader and the portfolio manager, an auction, or domain-wide policies that are enforced by the domain administrator. The fee structure can be, for instance, one-time fixed (the trader is paid a one-time fee each time a portfolio manager selects his algorithm), periodic fixed (the trader is paid a fixed fee at some periodicity, such as quarterly), performance based (a percentage of the management fees collected by the portfolio based on the number of other algorithms used by the portfolio), weighted performance based (similar to performance based, but with weights attributed to each algorithm), or attribution weigh performance based (similar to weighted performance based, but the weighting is determined by the extent to which the algorithm contributed to the overall performance of the portfolio).

More specifically, algorithm A1 is attributed to portfolio P1 using a periodic fixed fee structure and receives $500 for each quarter that the algorithm is used by P1. Portfolio P2, however, uses a performance-based fee structure, and, because there are three other algorithms (not shown) used by P2, is assigned a portfolio allocation 825 of 25% (i.e. ¼ of the total allocation). Similarly, portfolio P3 has a portfolio allocation 825 of 33%, based on a total of three algorithms used in that portfolio. Unlike P2, however, P3 is assigned using an attribution performance fee structure. Based on the allocation, the algorithm is assigned basis points 830 that are used in conjunction with the management fees collected 835 for the current (or some other) period, and in the case of P3 the performance attribution 840 to determine the license fee 845 due to the algorithm from each portfolio, which comprise the total license pool 850 for that algorithm. The license pool 850 can then be distributed to each trader according to the allocation percentages, to arrive at an individual trader's share 855.

In this example, P1 has agreed to pay a fixed fee of $500 to the total license pool, and therefore allocations, performance, basis points and management fees are not relevant. However, P2 is paying based on a performance-based structure, and based on the allocation of 25%, has agreed to pay 2.5 basis points to the license pool for A1. After determining that management fees collected amounted to $10,000, a license fee of $250 is paid to the pool ($10,000×2.5%). For portfolio P3, the portfolio allocation is 33% (there are three algorithms used) and thus 3.3 basis points. Using a straight performance-based fee structure and with management fees of $10,000, the license fee due would be $330. However, P3 has agreed to an attribution performance-based fee structure, and based on the performance of the portfolio and the specific strategies implemented by A1, 75% of the gains in the portfolio can be attributed to A1. As a result, the license fee is increased to $750 ($10,000×(3.3×(75%/33%))).

The total license pool for A1 from each of the portfolios is then $1,500 ($500+$250+$750). Based on the allocation percentages attributed to each trader that developed the algorithm, the resulting trader shares are $900 for trader T1 and $600 for trader T2.

The domain administrator can use the competitions and investment opportunities to attract sponsorship. In particular, contestant information (e.g., email addresses, interests, geographical information, employment history, ratings, etc.) can be provided to a sponsor in exchange for sponsorship of one or more of the contests or of the domain in general. Sponsorship can include many things, but generally includes providing financial support for the competition and/or for the domain administrator. For example, in one embodiment, a sponsor provides the prize money that is awarded to contestants who have outperformed other contestants, either in individual competitions or by achieving a higher overall rating. Although described below as sponsoring the entire competition, a company can also sponsor a part of the competition (e.g., a round of a competition). In one embodiment, a logo and other promotional information associated with a sponsor of the competition is displayed on the contestant's web browser or client software during the competition. By sponsoring a contest and receiving contact information of highly skilled traders in return, the sponsors gain access to potential employees that have a proven ability to outperform other traders, market indices, and other benchmarks.

In one embodiment, a domain administrator tailors the information about traders that is provided to the sponsor. In this embodiment, only portions of trader information is provided to the sponsor, based on one or more criteria, which can be determined by the sponsor, the domain administrator, or both. For example, the criteria may be a geographic preference for employment, years of work experience, market segment specialty or other specific skills, and current employment status of the trader (e.g., active job hunting, passive job hunting).

The criteria may also be a rating range that a sponsor will consider for employment opportunities. If the trader is rated lower than the minimum rating for that sponsor that trader's information is not provided to the sponsor. After trader information for particular traders is transmitted to a sponsor, the sponsor may then contact the trader for employment and/or consulting opportunities (e.g., the development of a specific algorithm). In one embodiment, the sponsor communicates with the domain administrator to obtain trader information for potential employment. Further, the sponsor communicates with the domain administrator and the domain administrator then communicates with the trader regarding requested information and employment opportunities. Thus, the domain administrator acts as an agent for the traders to find employment and/or license their algorithms.

In one embodiment, trader information is provided directly to the sponsor about one or more traders and the sponsor subsequently contacts the trader directly. In one embodiment, the sponsor contacts the trader through a communication service (e.g. electronic messaging) provided by the domain administrator, using, for example, the trader's username or "handle." In this way, the actual identity of the trader can be hidden from the prospective employer, and the trader can decide whether to respond to the inquiries made by the sponsor. Additionally, a trader who has a high rating relative to other traders may use that rating to bolster the trader's negotiating power when negotiating a starting salary, license terms, and/or benefits with the prospective employer.

In some instances, the domain administrator facilitates matching traders with opportunities for temporary or contract-based employment opportunities at companies that have a need for a particular skill. For example, a small hedge-fund may have a need for one or more highly-skilled traders who have demonstrated their ability to implement complex trading strategies using automated algorithms, but the fund does not wish to hire full-time traders or programmers to do so. In such a case, the domain administrator can provide the hedge fund with access to certain traders that match particular criteria (ratings, interest areas, etc.).

In one embodiment, the domain administrator provides one or more advertisements to the traders, investors and/or portfolio managers for viewing when accessing the domain. The advertisements may be displayed on the web browser, the client software, or some combination. One or more advertisers supply these advertisements to the domain administrator. An advertiser may be a sponsor of a trading competition and may further be a company or firm that hires analysts, manages investment accounts, and/or develops software and/or other technology to support such efforts. The advertisers may provide products and services that are known to be of interest to individuals that actively trade securities, such as vacations, expensive cars, and the like. In some cases, the domain administrator can create a separate instance of the domain for the exclusive use and branding of a sponsor, thus creating a "private label" investment domain for the sponsor. The advertiser may also be the domain administrator. An advertisement may include, without limitation, an HTML link, a pop-up advertisement, a logo, a quote, a word, a paragraph, a picture, or a sound or video clip. In some embodiments, the viewing time of the advertisements by each trader is tracked and provided to the advertiser.

In one embodiment, the same advertisement is provided to each user of the domain, and information about the users is provided to the advertiser in the aggregate. The information may include, for instance, the experience of the users viewing the advertisement, the rating of a trader (in the case the ads are shown to traders), and/or the geographic preference of the user. For example, if ten extremely skilled traders having a rating above or equal to 2000 viewed the advertisement for a total time of 30 minutes, twelve highly skilled traders having a rating above or equal to 1800 but below 2000 viewed the advertisement for 27 minutes, and twenty skilled traders having a rating above or equal to 1500 but below 1800 viewed the advertisement for 31 minutes, such information can be provided to the advertiser. A list of the time each trader viewed the advertisement as well as other information about each of the above-mentioned traders, such as that they have a geographic preference of Chicago, Ill. can also be provided.

In another embodiment, different advertisements are shown to different user based on information provided during the registration process. For example, if an advertiser is a brokerage house located only in New York and focuses on international equities, this advertiser's advertisements can be provided to traders having trader information matching the above information (i.e., geographic preference of New York, investment strategy of international investing). In other cases, investors having identified themselves as active golfers (through surveys provided by the administrator or having previously selected other ads for golf-related products or services, for example) can be presented with ads for additional golf-related products. Registration data can also be combined with other marketing data, such as demographic data, spending habits, and previous purchases to further target advertisements at the appropriate users.

The presentation of advertisements can also be based on the roles the user maintains within the domain. For example, an active trader may be interested in financial-related advertisements, such as opportunities to refinance a mortgage, whereas an investor that merely uses the services of the domain to passively invest may be provided ads for general consumer goods. In some embodiments, the domain administrator may charge a fee for providing access to selected portions of the domain (e.g., functions, content or both) and offer a reduction in such fees for users willing to view advertisements during their use of the domain.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A system for initiating trades in an investment account, comprising:
a communications server for communicating investment information to a plurality of investors, the investment information comprising trader performance data and qualification event results;
a qualification server for facilitating qualification events among the plurality of traders to identify exemplary traders;
a performance module for calculating performance data associated with each of the traders;
an allocation module for facilitating selection of traders by individual investors by allowing investors to establish, alter, and delete links between their investment accounts and one or more traders, allocating individual investors accounts among traders selected by the individual investors, and specifying trading rules for adjusting trade instructions made by traders as correlative trades in linked individual investor's investment accounts; and
a trading module for receiving a trade instruction from one of the traders and initiating in response to the received trade instruction a correlative trade in investment accounts associated with investors, wherein the correlative trade is adjusted based on the specified trading rules.

2. The system of claim 1 wherein each qualification event is a virtual investment competition.

3. The system of claim 1 wherein the allocation of money to each of the portfolio managers is based at least in part on an investment strategy adopted by each respective portfolio manager and communicated by the communication server.

4. The system of claim 1 wherein the allocation of money to each of the portfolio managers is based on historical performance data of each respective portfolio manager.

5. The system of claim 1 wherein an investor can select multiple portfolio managers.

6. The system of claim 1 wherein multiple investors can select one portfolio manager.

7. The system of claim 1 wherein multiple investors can select multiple portfolio managers.

8. The system of claim 1 wherein a trade detail of the correlative trade is adjusted prior to execution in the investment account associated with the one of the individual investors.

9. The system of claim 8 wherein the trade detail is the number of shares.

10. The system of claim 8 wherein the adjustment is a proportional adjustment.

11. The system of claim 10 wherein the proportional adjustment is based on a relationship between an existing portfolio allocation of the investment account associated with the one of the individual investors and a resulting portfolio allocation of the investment account associated with the one of the individual investors if the correlative trade were to be executed.

12. The system of claim 10 wherein the proportional adjustment is based on a relationship between a total portfolio value attributed to the portfolio and a total portfolio value attributed to the individual investor.

13. The system of claim 12 wherein the total portfolio value for the individual investor comprises account totals from multiple investment accounts.

14. The system of claim 8 wherein the adjustment is an absolute adjustment.

15. The system of claim 14 wherein the absolute adjustment results in the correlative trade not being executed.

16. The system of claim 8 wherein the adjustment is made in response to one or more trading rules specified by the individual investor.

17. The system of claim 1 wherein the correlative trade is initiated in multiple investment accounts associated with one of the individual investors.

18. The system of claim 1 wherein the trading module executes the correlative trade.

* * * * *